US012535780B1

(12) United States Patent
Pronovost

(10) Patent No.: US 12,535,780 B1
(45) Date of Patent: Jan. 27, 2026

(54) EFFICIENT RELATIVE POSITION-AWARE ATTENTION FOR TRANSFORMER-BASED MACHINE-LEARNED MODELS

(71) Applicant: Zoox, Inc., Foster City, CA (US)

(72) Inventor: Ethan Miller Pronovost, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 182 days.

(21) Appl. No.: 18/423,182

(22) Filed: Jan. 25, 2024

(51) Int. Cl.
  G05B 13/02 (2006.01)
  B60W 50/00 (2006.01)
  B60W 60/00 (2020.01)

(52) U.S. Cl.
  CPC ..... *G05B 13/0265* (2013.01); *B60W 50/0097* (2013.01); *B60W 60/0027* (2020.02); *B60W 2556/40* (2020.02)

(58) Field of Classification Search
  None
  See application file for complete search history.

(56) References Cited

U.S. PATENT DOCUMENTS

2021/0181758 A1\* 6/2021 Das .................. G06F 18/25

OTHER PUBLICATIONS

U.S. Appl. No. 18/227,813, filed Jul. 28, 2023, Pronovost,. "Cross-Attention Prediction Model Using Dynamic Token Resolution Based on Sensor Data and/or Map Data", 63 pages.
U.S. Appl. No. 18/304,975, filed Apr. 21, 2023, Buelina, et al., Cross-Attention Perception Model Trained to Use Sensor and/or Map Data, 63 pages.
Dai, et al., "FlashAttention: Fast and Memory-Efficient Exact Attention with IO-Awarness", Department of Computer Science, Stanford University, Department of Computer Science and Engineering, University at Buffalo, SUNY, Jun. 24, 2022, pp. 1-34.
Wu, et al., "Rethinking and Improving Relative Position Encoding for Vision Transformer", Sun Yat-sen University, Microsoft Research Asia, arXiv:2107.14222v1 [cs.CV] Jul. 29, 2021, pp. 1-13.

\* cited by examiner

*Primary Examiner* — Hitesh Patel
*Assistant Examiner* — Wenyuan Yang
(74) *Attorney, Agent, or Firm* — Lee & Hayes, P.C.

(57) ABSTRACT

A transformer-based machine-learned model may use relative positions between token embeddings to more accurately predict outputs. Example outputs may include an object detection, sensor data segmentation, object state prediction, and/or the like. Efficiently computing relative position-aware attention scores of the transformer-based machine-learned model may comprise utilizing fast memory available in specialized hardware according to the memory loading and flushing techniques described herein.

20 Claims, 7 Drawing Sheets

EFFICIENT RELATIVE POSITION-AWARE ATTENTION FOR TRANSFORMER-BASED MACHINE-LEARNED MODELS

BACKGROUND

Autonomous vehicles may use sophisticated machine-learned models to predict behaviors and motion trajectories of objects in an environment through which the autonomous vehicles traverse. Future positions of multiple objects may need to be considered simultaneously to avoid collisions and plan a safe path for the autonomous vehicle. Using larger models comprising a larger number of parameters may result in improved prediction performance. However, training of such large models is extremely computationally expensive. Moreover, predicting behaviors of multiple objects may require a large amount of computational bandwidth and storage, which may make some computations infeasible within an allowable reaction time of the autonomous vehicle due to high latency of prediction computations.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
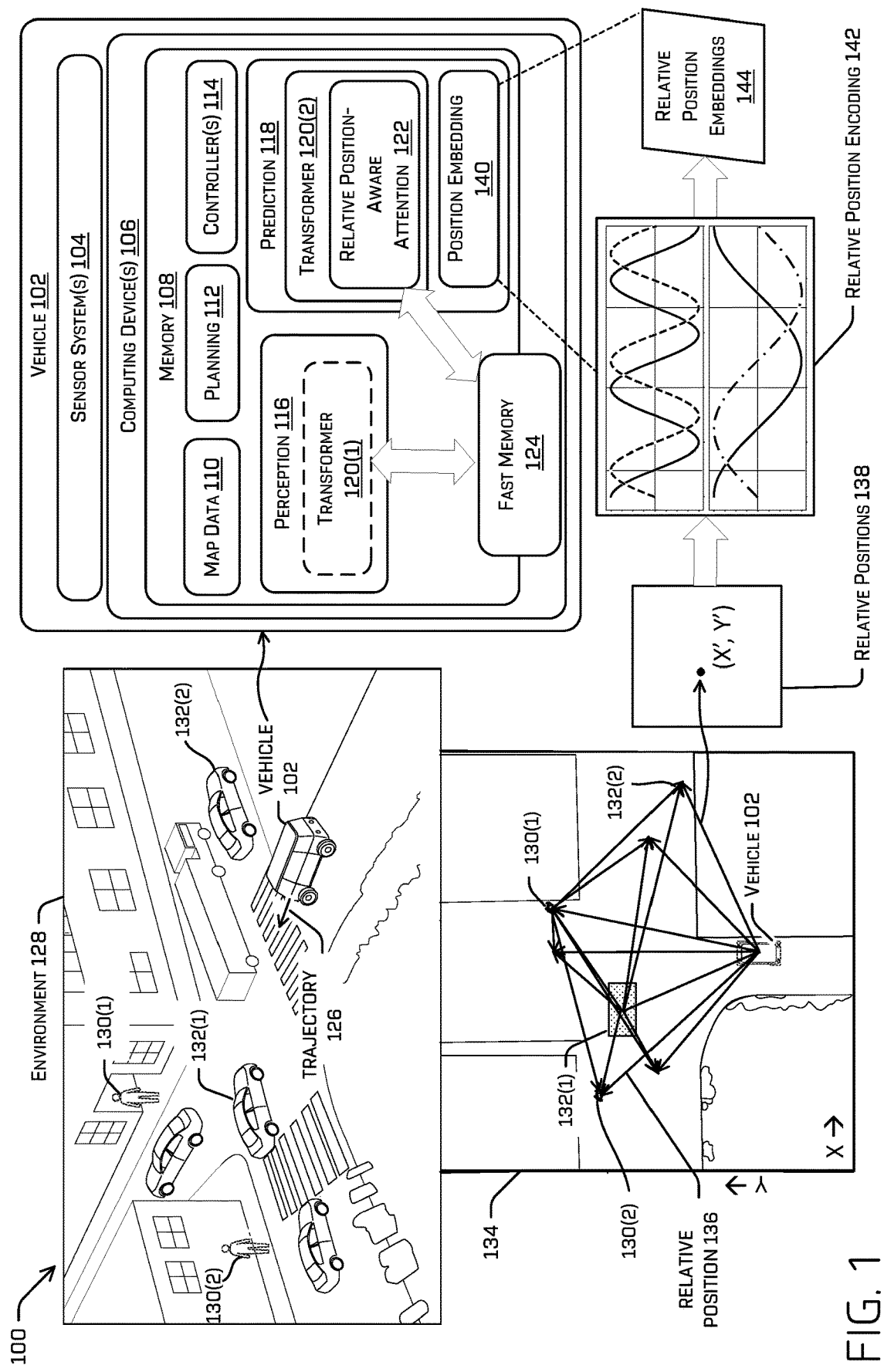
FIG. 1 illustrates an autonomous vehicle and an example scenario illustrating the incorporation of relative position embeddings in a transformer-based machine-learned architecture.

An autonomous vehicle system may model behavior, characteristics and/or motion trajectories of multiple objects in an environment a vehicle is traversing. Examples of objects may include dynamic objects such as vehicles, pedestrians, cyclists, as well as static objects such as stop signs, lanes, traffic lights, pedestrian crossings, buildings, etc. In some examples, the dynamic objects may be determined based on sensor data captured by the autonomous vehicle while traversing the environment, whereas the static objects may be determined based on sensor data and/or map data associated with the environment. In examples of the present disclosure, objects or portions of environment state data may be represented as tokens in a transformer-based machine learning architecture, where a transformer-based machine-learned (ML) model may be used to detect an object, determine a predicted state associated with an object, and/or determine a trajectory for controlling motion of the autonomous vehicle. As an example, an object could be detected from sensor data captured by sensor systems of the autonomous vehicle, by associating a portion of the sensor data with the object. As another example, a predicted state of an object, indicating a position (e.g., x-, y-, and/or z-coordinates in a 2D or 3D coordinate system), an orientation (e.g., a yaw/heading), and/or a velocity may be generated from current or previous states of object(s) in the environment.

In some examples, a transformer-based ML model may include an attention mechanism that determines a relative importance of an input token (e.g., key) to another input token (for cross-attention) or to itself (for self-attention). For example, where the transformer-based machine-learned model is being used to detect an object, an input token may comprise a portion of sensor data and/or a portion of a top-down representation of the environment in which the vehicle is operating. In an example where the transformer-based machine learning model is being used to predict a future state of an object (e.g., using cross-attention), an input token may comprise object data (e.g., previous behavior of the object, current and previous motion of the object, current and previous position and orientation of the object, associated map features, etc.) associated with the object and another input token may comprise a portion of a top-down representation of the environment (which may include map data, other object detection(s), environment state indication(s), and/or the like).

The transformer-based ML model may comprise an encoder for determining an input embedding (e.g., a vector or tensor) that represents characteristics of the input token and the attention mechanism of the transformer-based ML model may determine how important or relevant another or the same input token is to that token. The transformer-based ML model may also comprise a decoder that determines an output embedding (which may be in a different embedding space than an embedding space of the input embedding) based at least in part on context vector(s) that represent attention-weighted (or attended) input embeddings. Examples of encoders for generating token embeddings corresponding to objects, sensor data, and map data and corresponding decoders for outputting object detection(s), depth information and semantic segmentation(s) are described in U.S. application Ser. No. 18/304,975, filed Apr. 21, 2023, the entirety of which is incorporated by reference herein for all purposes.

Standard attention mechanisms, including self-attention and cross-attention, may be applied at the encoder, decoder, or both, in a transformer-based ML architecture. In examples of a transformer-based ML architecture, computation of attention is expressed in terms of query, key, and value vectors, where the vectors are obtained by a vector-to-matrix multiplication of input embeddings with weight matrices which may be learned during a training phase. Typically, multiple query, key, and value vectors may be grouped together into matrices Q, K, and V corresponding to queries, keys, and values respectively. The embeddings selected for queries, keys, and values are based on the attention mechanism e.g., for self-attention the queries and keys may include embeddings generated for a same token, while cross-attention uses a query generated for a first token and a key generated for a second token. An example application of prediction using cross-attention in the autonomous vehicle domain is discussed in the U.S. application Ser. No. 18/227, 813, filed Jul. 28, 2023, the entirety of which is incorporated by reference for all purposes.

Transformer-based ML models may require prohibitive amounts of time, computational resources, and/or memory to operate at real-time speeds on consumer-grade hardware using standard (or "vanilla") implementation of the attention computations discussed above. A significant improvement to the computation of attention, enabling training and deployment of larger models, includes an input/output aware (I/O-aware) attention algorithm, that exploits the availability of fast memory (e.g., access speed of about 20 Tb/s) on specialized hardware such as graphics processing units (GPUs). For example, the I/O-aware algorithm completes exact computations of the standard implementation of attention more efficiently by tiling (or chunking) the matrices containing the input token embeddings into smaller blocks that fit within size limitations of the fast memory, and combining intermediate results using forward and backward passes.

In examples of a transformer-based ML architecture, input embeddings may be associated with position embeddings. As an example, input tokens may represent physical objects in an environment, patches in a top-down representation of a scene, groups of data points in sensor data, pixels in an image, and the like, and position embeddings corresponding to the input embeddings may represent spatial positions of the input tokens from which the input embeddings are generated. In other examples, the position embeddings may represent relationships in an embedding space. In examples of the present disclosure, positions of the input tokens may be represented as relative positions between pairs of input tokens, which may represent a spatial relationship between the underlying input tokens from which input embeddings are generated. In examples, relative position embeddings corresponding to the relative positions may be obtained using various relative position encoding (RPE) methods, which may include fixed encodings, such as a sine/cosine encoding, or learned encodings using a trained encoder. It should be noted that, in a transformer-based ML model, the relative position encoding (RPE) discussed herein may be used in conjunction with any type of encoders and decoders (e.g., any type of embeddings).

Representing positions of input tokens as pair-wise relative position embeddings, as discussed above, may result in improved prediction performance when compared with representations of positions as absolute positions in a scene- or agent-centric coordinate system. However, the I/O-aware attention algorithm may provide no mechanism for supporting a pair-wise relative position embedding for each pair (query, key) of embeddings. Techniques described herein may include I/O-aware implementations of attention computation that further incorporates relative position embeddings.

In examples, a fast memory available for computations, such as attention computation, may be limited in size. For example, a fast static random-access memory (SRAM) of a GPU may only be 20 megabytes in size, compared with gigabytes of slower high-bandwidth memory (HBM). As discussed herein, fast is a relative term indicative of memory speed, and may refer to read and/or write speeds, throughput, and/or latency of the respective memory in random, contiguous, or combinations of access patterns. In examples, a memory may be considered to be fast by virtue of having properties that positively impact execution speed of processing steps of the transformer-based machine-learned model (e.g., enables faster computation of an output of the ML model). In typical examples, processors of a computing device may have access to a hierarchy of memory which may include a slower memory with large storage capacity, and progressively faster memories with smaller storage capacities. In some computer systems, the hierarchy may be based on memory that is advantageous for certain aspects of transformed-based ML models without regard to size. For example, HBM memory or SRAM of a GPU may be faster for implementing ML models using the disclosed techniques. As discussed with respect to the I/O-aware attention algorithm, the matrices containing the input token embeddings may be tiled into smaller blocks that fit within size limitations of the fast memory. In a first example method of the present disclosure, an I/O-aware computation of attention which includes relative position embeddings (henceforth called "efficient relative position-aware attention") may be implemented by loading a portion of the relative position embeddings corresponding to the blocks of the queries and keys matrices in the fast memory, and performing the efficient relative position-aware attention computations on the embeddings loaded in the fast memory. For example, the portion of the relative position embeddings may include relative position embeddings corresponding to each (query, key) pair of the blocks of the queries and keys matrices, and the efficient relative position-aware attention computation may include adding the corresponding relative position embedding to the weighted query or the weighted key. Intermediate results may be stored and combined in a manner similar to the I/O-aware attention algorithm.

Though the computation of the relative position embedding matrix itself is quadratic in the number of keys or queries, a same embedding may be used in all attention layers of the transformer-based ML model without significant deterioration in performance of the transformer-based ML model, i.e., the relative position embedding matrix may be computed once, and the same matrix reused in up to all layers of the transformer. Therefore, with large transformer-based ML models, including a large number of attention layers, the computation of the relative position embeddings approaches a fixed cost using the techniques discussed herein. The first efficient relative position-aware attention method described herein enables training and deployment of larger transformer-based ML models (which may be more accurate) by reducing a time required to compute attention through efficient usage of fast memory.

In some scenarios, where poses (i.e., positions and/or orientations) of objects being modeled may change rapidly, it may be necessary to recompute the relative position embedding matrix, R, e.g., at one or more attention layers of the transformer-based ML model. However, recomputing R for each layer adds a quadratic computation cost, which may be time and/or computational resource prohibitive. In a second efficient relative position-aware attention method described herein, the relative position embedding may be computed as needed (e.g., on the fly) for a given (query, key) pair that is loaded into the fast memory. In some examples, the relative position embedding computed may be based on a limited number of possible poses corresponding to the keys and a limited number of possible poses corresponding to the queries. Though computing the relative position embedding on the fly requires computation of relative position and pose as well as an embedding (e.g., sine/cosine positional embedding), the computation is less intensive than computation of the attention score itself, and therefore, and may still provide significant speed improvements.

The efficient relative position-aware attention methods described herein are agnostic to the type of embedding used for generating the queries, keys, and values. Some examples of transformer-based ML models using various embeddings for queries and keys are described in U.S. application Ser. No. 18/304,975, filed Apr. 21, 2023, which has been incorporated by reference, as noted above. Additionally, though motion and object behavior prediction in an autonomous vehicle is used as an example use scenario to describe the efficient relative position-aware attention methods, the methods are applicable to any domain where spatial relationships between input tokens are relevant to an output being predicted by a transformer-based ML model. The spatial relationships may be two-, three-, or higher dimensional (e.g., including 3D pose information). For example, the efficient relative position-aware attention methods may be used in conjunction with relative position embedding in semantic segmentation of a 3D scene or a 2D image, object detection in 3D or 2D, inferring depth, scene understanding, multi-agent behavior modeling, tracking eye and facial movements, and the like.

As discussed, using relative position embeddings for indicating positions and/or orientations of input tokens may improve accuracy of a prediction model. However, pair-wise relative position embeddings involve computational cost and storage that is quadratic in a number of tokens, and therefore, may limit the number of tokens that may be used to represent the scene, and/or limit a size of transformer-based models that may be feasibly trained or deployed. The techniques discussed herein increases speed of computation of attention while using relative position embeddings.

Accordingly, these techniques may increase the accuracy of predicted movements and/or states of an object by enabling the use of relative position encodings in conjunction with larger transformer-based ML models with quantitatively more trainable parameters (e.g., with a larger number of attention heads, a larger number of tunable parameters of any of the layers of the model (e.g., number of weight(s), bias(es), neurons in a layer of the model), more encoder or decoder layers, deeper feed-forward network, etc.) by reducing a time required for training such a transformer-based ML model. Moreover, the techniques make processing of computational steps of a transformer-based ML model more efficient, thus reducing computing requirements on the vehicle, or on a computing device running a simulation of the vehicle, needed to deploy such a model (e.g., for prediction). The techniques discussed may improve the safety and efficacy of autonomous vehicle operations by reducing latency of prediction and thus reducing stutters or hesitations that may be introduced by latency.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc.

Moreover, even though the vehicle 102 is depicted as a land vehicle, vehicle 102 may be an aerial vehicle, a spacecraft, watercraft, and/or the like.

According to the techniques discussed herein, the vehicle 102 may be equipped with sensor system(s) 104. For example, the sensor system(s) 104 may include one or more location sensors (e.g., a global positioning system (GPS) sensor), inertial sensors (e.g., an accelerometer sensor, a gyroscope sensor, etc.), magnetic field sensors (e.g., a compass), position/velocity/acceleration sensors (e.g., a speedometer, a drive system sensor), odometry systems (which may be determined based at least in part on inertial measurements and/or an odometer of the vehicle 102), depth position sensors (e.g., a Lidar sensor, a radar sensor, a sonar sensor, a time of flight (ToF) camera, a depth camera, an ultrasonic and/or sonar sensor), image sensors (e.g., a visual light camera, infrared camera), audio sensors (e.g., a microphone), and/or environmental sensors (e.g., a barometer, a hygrometer, etc.).

The sensor system(s) 104 may generate sensor data, which may be received by computing device(s) 106 associated with the vehicle 102. However, in other examples, some or all of the sensor system(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 which may store processor-executable instructions that, when executed by one or more processors, execute various operations. In examples, the memory 108 may store map data 110, a planning component 112, system controller(s) 114, a perception component 116, and/or a prediction component 118. One or more of the components 112, 116, 118 stored in the memory 108 may include a transformer (i.e., a transformer-based machine learned (ML) model), such as transformer 120(1) shown deployed in the perception component 116 and transformer 120(2) shown deployed in the prediction component 118. In examples of the present disclosure, the transformers 120(1), 120(2), as discussed with respect to the transformer 120(2), may implement a relative position-aware attention computation component 122 that utilizes a fast memory 124. In some examples, the fast memory 124 may reside on one or more graphics processing units (GPUs), tensor processing units (TPUs), or other AI accelerator hardware, operably connected to the computing device(s) 106. For example, the fast memory 124 may comprise a static random-access memory (SRAM) of a GPU, which may provide high-speed data access (e.g., 19 Tb/s), but may be limited in size (e.g., 20 Mb). In some examples, some portions of the memory 108 utilized by the transformers 120(1), 120(2) may also reside on the one or more GPUs containing the fast memory 124 (e.g., may correspond to high-bandwidth memory (HBM) of the GPUs). In examples, the HBM may be large (e.g., 40 Gb) but may provide slower-speed data access (e.g., 1.5 Tb/s).

In some examples, the map data 110 may include, for example, geometric data and embeddings associated with the geometric data. The geometric data may identify a location, dimensions, shape, and/or label associated with static features of the environment. In some examples, the location, dimensions, and/or shapes indicated by the geometric data may be three-dimensional. This map data may have previously been generated using a combination of sensor data collected from a vehicle and labelling of such data using machine-learned model(s) and/or human labelling. For example, a label may include a semantic label indicate that a portion of the geometric data is associated with a static object classification, such as a ground plane, roadway/drivable surface, building, signage, or various other static objects (e.g., mailbox, fountain, fence). Additionally or alternatively, the label (e.g., a semantic label and/or numeric or encoded label) may indicate a material type associated with a portion of the environment, such as asphalt, glass, metal, concrete, etc. These material types may have material characteristics associated with them, such as reflectivity, opacity, static coefficient, permeability, occlusion likelihood, and/or the like. The geometric data may be stored and/or indicated in any suitable manner, such as using a polygon representation, a digital wire mesh representation, and/or the like.

In some examples, the planning component 112 may determine trajectory 126 for controlling the vehicle 102 in an environment 128. The trajectory 126 may comprise instructions for the controller(s) 114 to actuate drive components of the vehicle 102 to effectuate a steering angle, steering rate, acceleration, and/or the like, which may result in a change in vehicle position, vehicle velocity, and/or vehicle acceleration. For example, the trajectory 126 may comprise a target heading, target steering angle, target steering rate, target position, target velocity, and/or target acceleration for the controller(s) 114 to track. In some examples, the trajectory 126 may be associated with controls sufficient to control the vehicle 102 over a time horizon (e.g., 5 milliseconds, 10 milliseconds, 100 milliseconds, 200 milliseconds, 0.5 seconds, 1 second, 2 seconds, etc.) or a distance horizon (e.g., 1 meter, 2 meters, 5 meters, 8 meters, 10 meters).

In some examples, the planning component 112 may determine the trajectory 126 based at least in part on perception data determined by the perception component 116, prediction output (e.g., predicted state(s) of an object including position and/or orientation) determined by the prediction component 118, and/or other information such as, for example, localization information (e.g., where the vehicle 102 is in the environment 128 relative to a map of the map data 110).

In some examples, the perception component 116 may receive the sensor data from the sensor system(s) 104 and determine data related to objects in the vicinity of the vehicle 102. In particular, the perception component 116 may determine, based at least in part on the sensor data, an object detection indicating an association of a portion of sensor data with an object in the environment. The object detection may further indicate an object classification (e.g., semantic label, object state), sensor data segmentation (e.g., mask, instance segmentation, semantic segmentation), a region of interest (ROI) identifying a portion of sensor data associated with the object, object classification, and/or a confidence score indicating a likelihood (e.g., posterior probability) that the object classification, ROI, and/or sensor data segmentation is correct/accurate (there may be confidence score generated for each in some examples). The object classifications determined by the perception component 116 may distinguish between different object types such as, for example, a passenger vehicle, a pedestrian, a bicyclist, a delivery truck, a semi-truck, traffic signage, and/or the like. In some examples, object detections may be tracked over time. For example, a track may associate two object detections generated at two different times as being associated with a same object and may comprise a historical, current, and/or predicted object position, orientation, velocity, acceleration, classification, and/or other state (e.g., door state, turning state, intent state such as signaling turn) of that object.

In the example driving environment 128 shown in FIG. 1, the vehicle 102 may receive the sensor data from the sensor system(s) 104, including image data (from one or more image sensors) and/or other sensor data associated with the environment, such as Lidar data, radar data, ToF data, and/or the like. The perception component 116 may detect and classify objects in the environment such as dynamic objects, e.g., a cyclist, vehicle, pedestrian, etc., and/or static objects, e.g., poles, traffic signage, general signage, a drivable surface, sidewalk, tree, building, etc. Referring to FIG. 1, the perception component 116 may detect pedestrians 130(1), 130(2) and vehicles, such as vehicles 132(1), 132(2) in the environment 128. In some examples, the perception component 116 may additionally or alternatively detect static objects such as buildings, lane markings, sidewalks, and/or pedestrian crosswalks shown in the environment 128.

In some examples, the perception component 116 may include a simultaneous localization and mapping (SLAM) component. In some examples, simultaneous localization and mapping (SLAM) techniques may be used to determine a position and orientation (e.g., a yaw or a heading) of the vehicle 102 in the environment, and associate a portion of the map data 110 with the vehicle's current location and orientation in the environment 128. The perception component 116 may also determine positions and orientations corresponding to other dynamic objects in the environment 128, such as the pedestrians 130(1), 130(2) and the vehicles 132(1), 132(2), based on the sensor data and/or tracking information maintained by the perception component 116 from previous time instances. In some examples, the perception component 116 may also determine the positions and orientations of static objects in the environment 128. Alternatively, or additionally, static objects may be indicated in the map data 110 stored in the memory 108, and the perception component 116 may determine the positions and orientations of the static objects based on the localization information of the vehicle 102 with respect to the map data 110.

In some examples, the perception component 116 may include a transformer-based ML model, such as the transformer 120(1), to perform object detection and/or classification based on the sensor data. In some examples, the transformer 120(1) may use token embeddings generated from the sensor data (e.g., image data, lidar data, radar data, and the like) and relative position embeddings of the underlying tokens as inputs for detecting and classifying objects. For example, the relative position embeddings may indicate spatial relationships between the tokens, in two- or three-dimensional physical space and/or an embedding space. Examples of such token embeddings are described in U.S. application Ser. No. 18/304,975, filed Apr. 21, 2023, which has been incorporated by reference, as noted above. Examples of transformer-based ML model, such as the transformer 120(1), performing object detection based on sensor data are described in a U.S. application Ser. No. 18/227,813, filed Jul. 28, 2023, incorporated by reference, as noted above. As will be discussed in further detail with respect to the transformer 120(2), transformer 120(1) may implement an I/O-aware attention computation component (not shown) utilizing the fast memory 124 to efficiently use relative position embeddings in the detection and/or classification of objects (e.g., with lower latency).

In examples, the perception component 116 may provide the positions and orientations of the objects in the environment 128, as perception data, to the prediction component 118. The perception data indicating positions and orientations of the objects may be available for a sequence of previous time instances e.g., every 0.2, 0.5, or 1 second for the previous 2, 5 or 10 seconds. The perception data may also include other aspects of object behavior or classifications of behavior e.g., an indication that the object is static or dynamic, an indication of random or erratic behavior, an indication of additional caution or safety margins needed, and the like. The prediction component 118 may determine predicted future positions and orientations and/or other behaviors of the objects in the environment 128 based on the perception data in the current and/or previous time instances.

In examples, the prediction component 118 may include a transformer-based ML model, such as the transformer 120(2), trained to predict future states (e.g., positions, orientations, and/or behaviors) of objects. The objects may be represented by object embeddings generated by an encoder portion of the transformer 120(2). In some examples, objects may be represented as patches illustrating their appearance in sensor data (e.g., a patch may be an area corresponding to a vehicle in image data). Example techniques for generating embeddings from patches are described in U.S. application Ser. No. 18/227,813, filed Jul. 28, 2023, incorporated by reference, as noted above. Other examples of transformers using embeddings using patches, which may be used as object embeddings, include DeiT, DETR, ViT, etc. For example, ViT and DeiT transformer models split an image into multiple fixed-size patches and create embeddings from the patches. In examples of the transformer 120(2), position embeddings may be used to represent the positions and/or orientations of the objects. For example, ViT and DeiT transformer models use absolute position encodings.

In examples of the present disclosure, poses (i.e., positions and/or orientations) of the objects may be represented as relative positions between pairs of objects. Such a representation is translation and rotation-invariant (e.g., if positions and/or orientations of two objects of a pair are moved or rotated by same amounts, there is no change in the relative positions), and shares computations across predictions with respect to each object, overcoming drawbacks discussed above with respect to other position representations, such as absolute position representations. This feature may simplify a prediction model learned by the transformer 120(2), and produce a prediction model of higher accuracy, as compared to absolute positions and orientations of objects which are not translation and rotation-invariant.

In an example shown in FIG. 1, the relative positions between the objects in the environment 128 may be represented in a two-dimensional top-down view 134 of the environment 128. Example techniques for generating a top-down representation of the environment, that includes information associated with detected objects in the environment and/or map data (e.g., which may indicate a roadway shape and extents, signage, static object(s), and/or the like), are discussed in U.S. Patent Application Pub. No. 2021/0181758, filed Jan. 31, 2020, the entirety of which is incorporated by reference herein for all purposes. As shown, the top-down view 134 includes positions of the dynamic objects in the environment 128, e.g., the vehicles 132(1), 132(2) and the pedestrians 130(1), 130(2), in a two-dimensional grid. The top-down view 134 may also include positions of various static objects in the environment 128 e.g., road signs, crosswalks, lane markings, sidewalks, buildings, etc. Though not shown, the objects represented in the top-down view 134 may also be associated with orientations indicating respective yaw or headings.

In the example shown in FIG. 1, relative positions between pairs of objects may be represented by vectors, such as relative position vector 136 between the vehicle 102 and the pedestrian 130(2). The relative position vector 136 may comprise a difference of distances along an X- and Y-direction between the vehicle 102 and the pedestrian 130(2), and/or a difference in orientation, which may be a heading in this example (e.g., if the pedestrian 130(2) is facing a same direction as the vehicle 132(1), the difference in orientation with the vehicle 102 is 90-degrees). For simplification, only the relative position vectors for pairs of objects with respect to the vehicle 102, the vehicle 132(1), and the pedestrian 130(1) are shown, however relative positions 138 may include all pairs of relative positions between the objects indicated in the environment, including static objects. For example, the relative positions 138 may include a difference along X-axis (X'), a difference along Y-axis (Y'), and a additionally include a difference in yaw (w') (e.g., w' may indicate that the vehicle 132(2) is at an orientation or heading nearly 90-degrees with respect to the heading of the vehicle 102), as shown for the relative position vector between the vehicle 102 and the vehicle 132(2), for each pair of objects. For example, with n objects in the scene, a n×n matrix, R, may represent the relative positions of the pairs of objects, where an entry in a cell r (i, j) is a vector indicating a relative position and orientation between an $i^{th}$ object and a $j^{th}$ object.

In examples, components of the relative position vectors may each be binned into a discrete number of levels. For example, differences in yaw may be binned in 20-degree increments between 0 and 360-degrees. Similarly, the differences along the X- and Y-axes may also be binned into a discrete number of levels. In some examples, the distances indicated in the relative positions 138 (e.g., X', Y') may be clipped to map the distances into a finite set of integers e.g., distances higher than a threshold distance may all be mapped to a single bin indicating objects far enough away that they may not impact a predicted state of each other.

Though the relative positions 138 are shown represented in two dimensions, in examples, the relative positions may include (x, y) dimensions plus yaw, be three-dimensional (e.g., using object positions in a three-dimensional representation of the environment 128) and/or include a three-dimensional orientation (yaw, pitch, roll). For example, three-dimensional representations (e.g., point clouds) of the environment 128 may be generated by the perception component 116 from lidar or radar data. As an example, three-dimensional relative positions and three-dimensional relative orientations may be needed for autonomous control of aerial vehicles such as drones. It should be noted that the same components shown with respect to the vehicle 102 in FIG. 1 may be used if the vehicle 102 was an aerial vehicle.

In examples, the relative positions and/or orientations (e.g., one or more of a relative x-, y-, z-position, roll, pitch, or yaw) may be encoded to produce a relative position embedding. As an example, sine/cosine positional encoding may be used to obtain the position embeddings. For example, relative x positions (e.g., $x_i$-$x_j$) may be encoded using sin x/cos x functions, relative y positions (e.g., $y_i$-$y_j$) may be encoded using sin 2x/cos 2x functions, and relative yaw may be encoded using sin 4x/cos 4x functions, and so on, for each of the dimensions in the position and orientation representation. However, relative position embeddings corresponding to the relative positions and/or orientation may be obtained using various relative position encoding (RPE)

methods, which may include fixed encodings, such as the sine/cosine encoding discussed above, or learned encodings.

In examples, the prediction component 118 may include a position embedding component 140 implementing a relative position encoding 142 to generate relative position embeddings 144 from the relative positions 138. For example, the position embedding component 140 may implement the relative position encoding 142 as a fixed position encoding such as a sine/cosine position encoding, where relative positions in X (e.g., X') may be encoded using sin x/cos x functions, y positions (e.g., Y') may be encoded using sin 2x/cos 2x functions, and relative yaw may be encoded using sin 4x/cos 4x functions. In some examples, the position embedding component 140 may be a part of the transformer 120(2), instead of a pre-processing component, and the relative position encoding 142 may be learned e.g., during a training phase of the transformer 120(2). For example, the transformer 120(2) may learn an encoding that depends on classifications of objects for object pairs, or a distance between the objects e.g., a bin size may increase as the relative distance increases, indicating that farther objects have less influence on each other's future states.

In some examples, the transformer 120(2) may determine an attention score using self-attention (e.g., using object embeddings as both the queries Q and keys K) or cross-attention (e.g., using the object embeddings as queries Q and map feature embeddings or top-down embeddings, as described in U.S. application Ser. No. 18/227,813, filed Jul. 28, 2023, as keys K), both attention computations requiring the computational steps noted above. As another example, input embeddings may represent dynamic objects in a scene (such as vehicles, pedestrians, bicycles, etc.) as well as map-based features (such as roadways, road signs, traffic lights, etc.), and a transformer-based ML architecture may use self-attention for prediction of object behaviors. The attention computations are memory-bound e.g., a slow-down in processing is caused by a need to access data, such as the matrices Q, K, and S, from standard memory 108. Additionally, the attention computations are quadratic in a number of token embeddings in the Q or K matrices. Significant speed improvements may be obtained by utilizing the fast memory 124 efficiently, using an I/O-aware attention algorithm.

A typical transformer-based ML architecture includes multi-head attention layers, in their encoder and/or decoder components, which are based on scaled dot-product attention. For example, attention computation requires calculating a dot product of queries Q and keys K matrices to determine attention scores (e.g., $S=QK^T$, where S is an attention score matrix), followed by scaling and softmax operations to determine a probability matrix, P (e.g., P=softmax(S)), and finally, computation of attended output matrix (or context vector), O, as a dot product of P and values (V) matrices (e.g., O=PV). In some examples, the object embeddings (used as the values V) and/or the attention scores may be provided as input to a machine-learned model, such as a multi-layer perceptron or transformer decoder, that determines the predicted states of the objects, such as via a binary output or likelihood (e.g., posterior probability) that may be softmaxed. An example transformer-based ML architecture is discussed in further detail with respect to FIG. 2.

To improve speed of computation of attention scores, an I/O-aware attention computation algorithm may be implemented on computing devices that include one or more GPUs, TPUs, or other AI accelerator hardware such as tensor processing unit(s) (TPU(s)). The GPUs may include size-limited fast memory (e.g., static random-access memory (SRAM)) and slower-speed but larger-sized memory (e.g., high-bandwidth memory (HBM), dynamic random-access memory (DRAM)). In examples of the I/O-aware attention computation, a block size is computed based on memory capacity of the fast memory (e.g., SRAM) such that a block of each of queries, keys, and values matrices (each of d-dimensions) fits in the fast memory, keeping the block size at a maximum that will fit. During an iteration of a recursive processing, a block (or tile) of the queries, keys, values, and output (initialized to zero at start) matrices, and partial computation results corresponding to the softmax function, are transferred into the fast memory from the HBM, the computations listed above are performed on the blocks in the fast memory, and computed intermediate values for the block of output O and updated partial computation results corresponding to the softmax function are written out to the HBM. At the end of the recursive processing, an exact computation of softmax(S) is available, and an exact computation of the attended output O is returned. Because the attention computation can be memory-bound, performing the computational steps on data that is loaded into the fast memory significantly improves speed of completion of the attention computation.

The I/O-aware attention computation algorithm can accommodate absolute position embeddings included as a part of the embeddings in the matrices Q, K, and V. As an example, using an I/O-aware attention algorithm, such as Flash Attention, enables use of longer context vectors and larger models resulting in more capable large language models (LLMs). Such an I/O-aware attention algorithm may tile the embeddings matrices into smaller blocks that fit within the size limitations of the fast memory 124, and perform the steps of the attention computation on a subset of the embeddings matrices loaded into the fast memory 124, writing the intermediate results to the standard memory 108. The intermediate results may be combined to obtain an exact computation of the context vector, O, using forward and backward passes. In addition, the I/O-aware attention algorithm may fuse steps of the attention computation into a single kernel, avoiding repeated reading and writing from the standard (slower) memory.

However, the available I/O-aware attention algorithm provides no mechanism for incorporating a relative position embedding that is computed for each (query, key) pair. In examples of the present disclosure, the transformer 120(2) (and the transformer 120(1)) may implement the relative position-aware attention computation component 122 that computes an efficient relative position-aware attention score while utilizing the fast memory 124. For example, the relative position-aware attention computation component 122 may load a portion of the relative position embeddings needed to perform the attention computations into the fast memory 124, based on the blocks of the queries and keys matrices that are loaded in the fast memory 124 during a current iteration, as discussed in detail with respect to FIG. 3A, or compute the relative position embeddings on the fly based on the positions and/or orientations of the input tokens as discussed with respect to FIG. 3B.

In some examples, the transformer 120(2) may determine a predicted state of dynamic objects in the environment. In some examples, dynamic objects may also include objects that move or change states in some way, like traffic lights, moving bridges, train gates, and the like, in addition to vehicles and pedestrians. For example, the transformer 120(2) may determine a series of predicted states, each of which may be associated with different times in the future up to a horizon time. A predicted state may include, for example, a predicted object position, orientation, area occupied, velocity, acceleration, and/or other state, and a series of predicted states may indicate a predicted path of the object. The series of predicted state(s) may include predicted states for five ticks into the future, where each tick is associated with a unit of time. For example, each tick may be associated with a 0.1, 0.5, 1, 2, or other unit of seconds interval of time into the future. Where each tick is associated with one second, the predicted state(s) may indicate a predicted state of the vehicles 132(1), 132(2) and the pedestrians 130(1), 130(2) at 1, 2, 3, 4, and 5 seconds into the future, where 5 seconds in the future is the horizon time of prediction.

In some examples, the planning component 112 may use the predicted states received from the prediction component 118 and/or the transformer 120(2), to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 112 may determine a route for the vehicle 102 from a first location to a second location; generate, substantially simultaneously and based at least in part on the perception data and/or simulated perception data (which may further include predictions regarding detected objects in such data), a plurality of candidate trajectories for controlling motion of the vehicle 102 in accordance with a receding horizon technique (e.g., 1 micro-second, half a second) to control the vehicle to traverse the route (e.g., in order to avoid any of the detected objects); and select one of the candidate trajectories as the trajectory 126 of the vehicle 102 that may be used to generate a drive control signal that may be transmitted to drive components of the vehicle 102.

In some examples, the training of the transformer-based ML models 120(1) and/or 120(2) may be performed on a remote computing system with hardware accelerators (e.g., GPUs, TPUs), or multiple computing systems in parallel, and the trained transformer-based ML models 120(1), 120(2) may be provided to the vehicle computing device(s) 106.

Example Transformer-Based Machine-Learned Model

Figure 2:
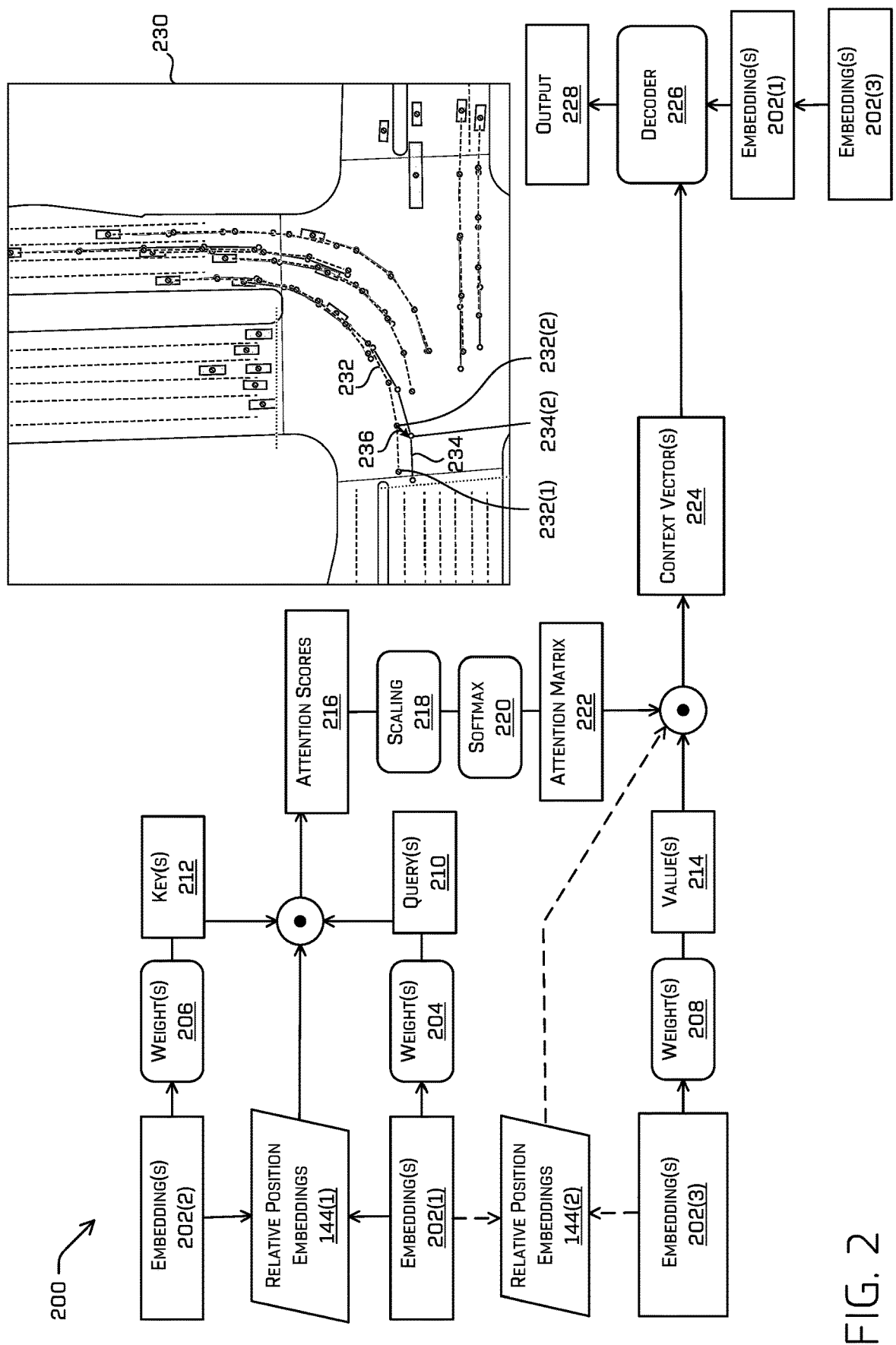
FIG. 2 illustrates a block diagram of parts of an example transformer-based machine-learned model using relative position-aware attention score(s) to determine predicted outputs associated with object(s) in an environment.

FIG. 2 illustrates a block diagram of an example architecture 200 of a decoder portion of an example transformer-based ML model discussed herein. In some examples, the example architecture 200 may represent the transformer-based ML model 120(1) or 120(2). This decoder portion may be used to determine attention score(s) and use the attention score(s), ML model head(s), and/or decoder(s) to determine output(s) that take into consideration relative positions of input embeddings. As an example, the output(s) may comprise predicted state(s) for an object that a vehicle can use to control operations of the vehicle. For example, the predicted state(s) may be at least part of prediction data used by the vehicle to control operations of the vehicle. As another example, the output(s) may comprise identification of portions of sensor data as detected object(s) and/or associated classification(s).

In the example shown, embedding(s) 202(1) corresponds to queries and embedding(s) 202(2) corresponds to keys, which may represent environment data, such as object data, for a transformer-based ML model which is configured as an object behavior prediction model (e.g., transformer-based ML model 120(2)). Though the example shown is with reference to an object behavior prediction model, in other examples, the embedding(s) 202(1), 202(2) may represent portions of sensor data, such as image data or 3D Lidar data, for a transformer-based ML model which is configured as an object detection and/or object classification model. The keys and queries may be associated with a same part of the environment (or sensor data) for self-attention or different parts of the environment (or sensor data) for cross attention.

In some examples, the embedding(s) 202(1), 202(2), 202(3) may correspond to object embeddings obtained by projecting object data into an embedding space, where the embedding may be a high-dimensional vector or tensor that represents the object data in the embedding space. The object data may include previous behavior of the object, current and previous motion of the object, current and previous position and orientation of the object, associated map features, and the like. Example techniques for generating object embeddings are described in U.S. application Ser. No. 18/227,813, filed Jul. 28, 2023, incorporated by reference, as noted above. In some examples, multiple object embeddings may be determined for the same object. Additionally, though a single-headed attention network is shown, a similar process may be followed for other attention heads of a multi-headed attention network that may process other object embeddings for the same objects. Finally, the transformer-based ML models 120(1), 120(2) may comprise multiple layers, each containing a multi-headed attention network.

The example architecture 200 may comprise weight matrices 204, 206, 208, determined during a training phase of the transformer-based ML model (e.g., by altering one or more weights of any one or more of the weight matrices to reduce a loss value). The query(s) 210, key(s) 212, and value(s) 214 may each be matrices comprising different vectors or tensors generated from the embeddings 202(1), 202(2), 202(3) respectively, as shown. For example, query(s) 210 may be obtained by matrix multiplication of the embedding(s) 202(1) by the weight(s) 204, key(s) 212 may be obtained by matrix multiplication of the embedding(s) 202(2) by the weight(s) 206, and the value(s) 214 may be obtained by matrix multiplication of the embedding(s) 202(2) by the weight(s) 208. In some examples, the embedding(s) 202(3), from which values are generated, may be the same embedding(s) as the key(s) embedding(s) 202(2), while in other examples, the embedding(s) 202(3) may be different from the embedding(s) 202(2).

In examples, a computation of attention that incorporates relative position embeddings may be represented as:

$$s_{ij} = (q_i W^Q)(k_j W^K + r_{ij})^T \qquad \text{(Equation 1)}$$

where $s_{ij}$ is the attention score between query $q_i$ and key $k_j$, and $W^Q$ and $W^K$ are projection matrices learned during a training phase of the transformer-based ML model. In the example architecture 200 shown, $W^Q$ corresponds to the weight(s) 204, $W^K$ corresponds to the weight(s) 206, and therefore, $q_i W^Q$ may correspond to $i^{th}$ row of query(s) 210 and $k_j W^K$ may correspond to $j^{th}$ row of key(s) 212. In Equation 1 above, $r_{ij}$ is an embedding in the relative position embeddings 144(1) matrix representing a relative position between embeddings corresponding to query $q_i$ and key $k_j$. As discussed with reference to FIG. 1, in some examples, the relative position embeddings 144(1) may represent spatial relationships between underlying input tokens of the embeddings 202(1), 202(2). It is to be noted that relative position embeddings 144(1) are added to the key(s) 212 during the computation of attention scores 216 (e.g., the score matrix S), and not concatenated within the query or key embeddings 202(1), 202(2) (e.g., as done in some examples of absolute position encoding). In some examples, the relative position embeddings 144(1) may be added with the query(s)

210 instead (e.g., $r_{ij}$ may be added to the $q_i W^Q$ term). In some examples, the attention scores, $s_{ij}$, may only be computed for one of i>j or i<j i.e., only an upper half (above a diagonal) or a lower half (below a diagonal) of an attention score matrix may be computed.

The example architecture 200 may determine attention scores 216 (i.e., self- or cross-attention scores) based at least in part on determining a dot product of the query(s) 210 matrix with a transpose of the key(s) 212 matrix after addition of the relative position embeddings 144(1), as shown in Equation 1. The attention scores 216 may be any number before being scaled at 218 and/or softmaxed at 220. For example, the attention scores 216 may be scaled by dividing the scores by the square root of the dimension of a key vector of the key(s) 212 matrix. This result may be softmaxed (e.g., at 220) to convert the result to a number between 0 and 1, obtaining attention matrix 222 comprising scaled and softmaxed attention scores corresponding to each (query, key) pair. Determining a dot product of the attention matrix 222 with value(s) 214 may be used to determine a context vector(s) 224. In examples where the embedding(s) 202(3) corresponding to the value(s) 214 are different from the embedding(s) 202(2) corresponding to the key(s) 212, relative position embedding(s) 144(2) between the embedding(s) 202(3) and the embedding(s) 202(1) corresponding to the query(s) 210 may also be provided for determining the context vector(s) 224 (e.g., by adding to the value(s) 214 before computing the dot product). The context vector(s) 224 may indicate contextual information associated with the embedding(s) 202(1) (e.g., object embedding(s)) and may be provided to one or more decoder(s) 226. Additionally, attention scores may be computed over multiple properties of the object data, such as position, orientation, velocity, acceleration, and/or other state.

In some examples, the decoder 226 may include a first multi-headed self-attention layer, a subsequent add and normalization layer, a second multi-headed self-attention layer, another add and normalization layer, a feedforward network (e.g., a multi-layer perceptron (MLP)), and another add and normalization layer to determine the outputs discussed herein. In an additional or alternate example, the decoder 226 may include just an MLP. In some examples, the decoder 226 may additionally or alternatively receive the embedding(s) 202(2) (which may correspond to a different embedding from the embedding(s) 202(1) in cross-attention), as input. In some examples, the decoder 226 may use the context vector(s) 224 alone, the context vector(s) 224 and object embedding 202(1), and/or the embeddings 202(1), 202(2), to determine an output 228.

In some examples, multiple context vector(s) 224 associated with different key vectors of the key(s) 212 may be provided as input to the decoder 226 to determine the output 228. The output 228 may include predicted state(s) associated with a future time that is associated with a maximum attention score for each object or a maximum combined attention score (where multiple attention scores are determined for different properties of the object data, since relatively high attention scores strongly correlates with the respective query vector of the query(s) 210 as containing predicted values, such as a predicted position, orientation, etc. of the object, according to the training discussed herein.

In some examples, the output 228 may indicate a series of predicted states of an object forming a predicted track of the object. In an example scene 230 shown in FIG. 2, a predicted track 232 may include a position 232(1) indicating a current position of an object, and position 232(2) may be a future position of the object. As shown, the example scene 230 may include multiple objects, and the output 228 may include predicted future positions and/or tracks for one or more of the multiple objects in the scene. Note that although position is discussed for simplicity herein, the output 228 may also include orientation information (e.g., heading direction) at each position.

The predicted state(s) of the output 228 may be provided, as part of the prediction data, to one or more downstream components of the vehicle. For example, the predicted state(s) may be provided to a planning component of the vehicle as part of prediction data for use by the planning component to determine a trajectory for controlling motion of the vehicle and/or other operations of the vehicle, such as whether to open or close an aperture, cause an emission (e.g., lights, turn signal, horn, speaker), transmit a request for teleoperations assistance, or the like. As an alternative example, the output 228 of the example architecture 200 that is configured to detect object(s) in sensor data, may include indications of portions of the sensor data corresponding to different detected objects (and/or object class), which may be included in perception data for downstream components of the vehicle.

In examples, training the transformer-based ML model of the example architecture 200 may comprise receiving training data that includes input data (e.g., object data, sensor data, map data, etc.) and ground truth data associated with the outputs for which the transformer-based ML model is being trained, such as object tracks, semantic segmentation, object detection, and the like. In the example shown, the training data May include object positions and orientations that were previously determined and saved by the vehicle systems as part of log data. In an alternative example (e.g., for transformer 120(1)), the training data may include sensor data and the ground truth may include a semantic segmentation, depth, object detection, etc. In some examples, the ground truth data may be generated and/or refined by a simulator, by a human or an advanced ML model. For example, the advanced ML model may be one that may be larger and more complex than may normally run on a vehicle and/or may take advantage of advanced processing, such as by using distributed computing to leverage multiple computing device(s) to determine the ground truth data.

In examples, training of the transformer-based ML models (e.g., 120(1), 120(2)) corresponding to the architecture 200 may include determining a difference between the output 228 of the transformer-based ML model and the ground truth data of the training data. For example, the example scene 230 illustrates a ground truth object track 234, where the predicted position 232(2) of the output 228 corresponds to the ground truth position 234(2). In this example, a difference vector 236 may be determined during the training phase. A loss (e.g., L1 loss, L2 loss, Huber loss, square root of the mean squared error, Cauchy loss, or another loss function), may be determined based on this difference and that loss may be backpropagated through the component(s) of the architecture 200. This means that parameter(s) of any of these components may be altered (using gradient descent) to reduce this loss such that, if the transformer-based machine-learned model repeated the process on the same input data, the resultant loss would be less than it was on the last run. This process may be repeated for multiple iterations of data, known as a training dataset. For example, the training may comprise altering one or more weights of the weight(s) that generate the queries, keys, and values discussed herein, parameter(s) of the multi-headed attention layers (of any of the encoder(s) and/or decoder(s)), weight(s) and/or biases associated with the feedforward network(s) discussed herein (of any of the encoder(s) and/or decoder(s)), and/or the embedding(s) themselves.

Example Efficient Relative Position-Aware Attention Computation

Figure 3A:
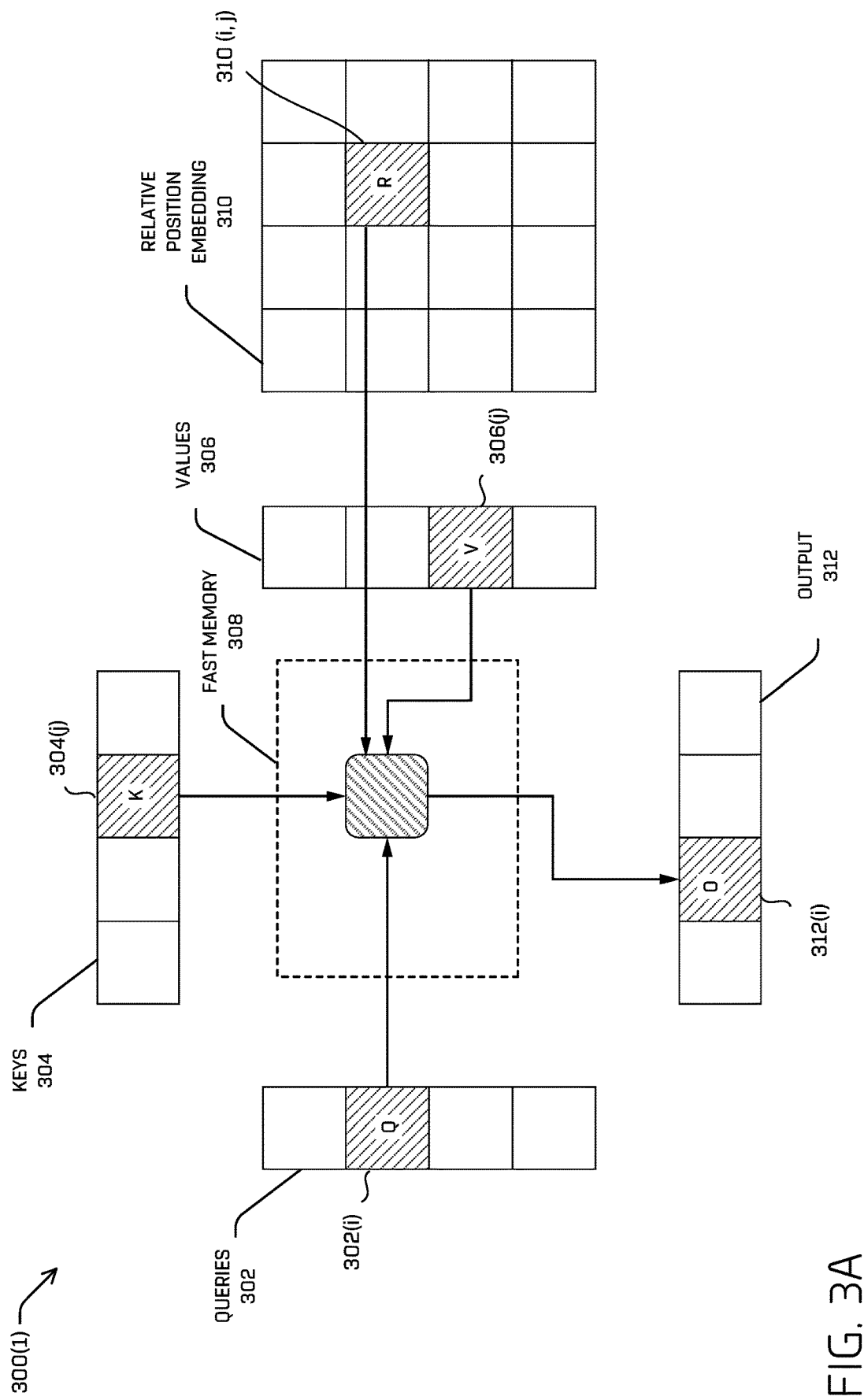
FIGS. 3A and 3B illustrate alternative examples of using a fast memory to efficiently compute a relative position-aware attention scores of FIG. 2.
Figure 3B:
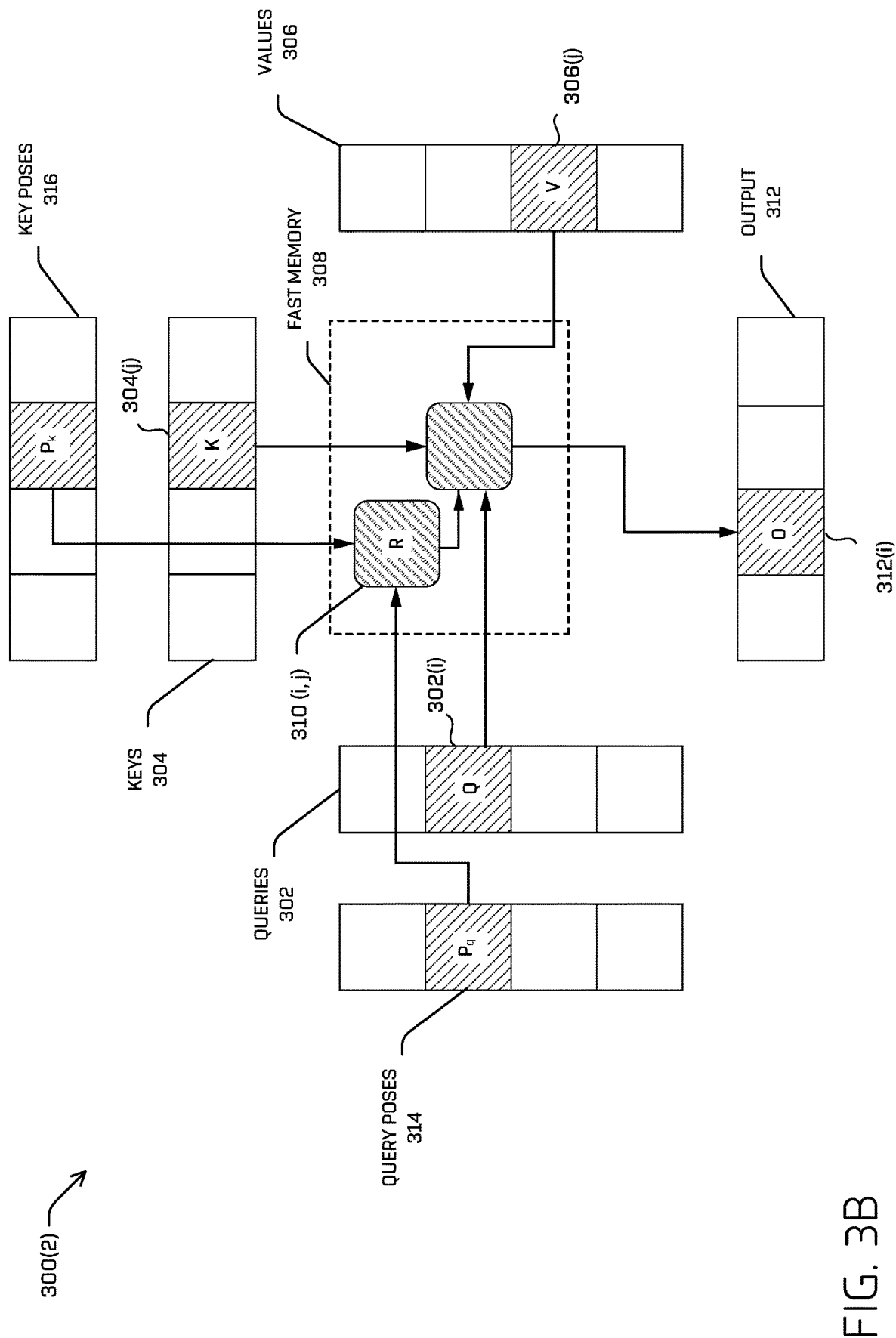

FIGS. 3A and 3B illustrate block diagrams of relative position-aware attention computations utilizing a fast memory. As discussed, computer hardware on which a transformer-based ML model (e.g., 120(1), 120(2)) is trained and/or deployed may include specialized graphics processing unit(s) (GPUs), TPUs, or other AI accelerator hardware. Such GPUs or hardware typically include a fast, on-chip memory (e.g., providing fast read/write access to data) that is usually limited in size. As an example, a A100 GPU chip includes 192 KB of on-chip static random-access memory (SRAM) providing access speeds of around 19 Tb/s, and a 40-80 Gb standard memory (e.g., high-bandwidth memory (HBM)) providing access speeds of 1.5-2 Tb/s. As also discussed, standard (or "vanilla") attention computation requires computation of an attention score matrix(S) by performing a dot product of queries (Q) with a transpose of keys (K) matrices (e.g., $S=QK^T$), followed by scaling and softmax operations to determine a probability matrix, P (e.g., P=softmax(S)), and finally, computation of attended output matrix (or context vector), O, as a dot product of P and values (V) matrices (e.g., O=PV). These computations may be memory-bound (e.g., effective speed of computation may be slowed down by reading and writing data from memory rather than due to processor speed limitations), and therefore, significantly faster speed of computation may be achieved by using data in a fast memory for computations. However, given the small size of fast memory like SRAM, it is not trivial to use the fast memory for the complex attention computations discussed herein, given the potentially large data size.

In examples, due to the limited size of the fast memory, the matrices required for attention computation cannot be loaded in their entirety into the fast memory, and additionally, the attention score matrix, which is quadratic in the size of the query or key vector, cannot be stored in the fast memory in its entirety for the computation of softmax of the attention score matrix. As discussed, the I/O-aware attention algorithm completes an exact computation of the output matrix by tiling (or chunking) the matrices required for the computation (e.g., queries, keys, and values matrices) into smaller blocks that fit within the size limitations of the fast memory, and combines intermediate results using forward and backward passes. However, the I/O-aware attention algorithm has no mechanism for supporting a pair-wise relative position embedding for each pair (query, key) of the queries and keys embeddings.

FIG. 3A illustrates a first example method 300(1) of computation of relative position-aware attention utilizing a limited-size fast memory. In examples of a first efficient relative position-aware attention method, a block size, B, may be computed for which blocks of size B of the queries, keys, and values matrices, and a corresponding portion (of size $B^2$) of the relative position embeddings matrix will fit in the fast memory (i.e., the fast memory is well-utilized with a block size of B). In some examples, the block size, B, may be selected based on specific characteristics of memory hardware being used e.g., bandwidth, access method, type of memory, and the like, to provide higher efficiency during memory usage. In some examples, the block size, B, may be empirically determined e.g., based on measurements of memory speed during experiments using various block sizes on a specific memory hardware/software. During an iteration of recursive processing similar to the I/O-aware attention algorithm, a query block 302(i) of queries 302, a key block 304(j) of keys 304, and a value block 306(j) of values 306 are loaded into a fast memory 308 (e.g., SRAM memory of GPUs). Additionally, to compute a relative position-aware attention score, a portion 310(i, j) of relative position embedding matrix 310 is also loaded into the fast memory 308 (or otherwise made available for computation), where the portion 310(i, j) comprises the relative position embeddings for each (query, key) pair of the query block 302(i) and the key block 304(j). For example, if the query block 302(i) comprises queries (n, . . . , n+B), and the key block 304(j) comprises keys (m, . . . , m+B), the first efficient relative position-aware attention method 300(1) also loads a portion of the relative position embedding matrix 310 with cell indices (x, y) where (x=n, . . . , n+B, y=m, . . . , m+B) in the fast memory 308. As a result, all components of Equation 1 needed for the computation of attention scores $s_{ij}$ (for i=n, . . . , n+B and j=m, . . . , m+B) are available in the fast memory 308, and the first efficient relative position-aware attention method 300(1) may perform the attention score computations of Equation 1 while the required data is in the fast memory 308.

Other steps of the attention computation, such as scaling and softmax operations, and the computation of attended output matrix (or context vector), O, as a dot product of softmaxed attention score and values matrices may be performed similarly to the I/O-aware attention algorithm. For example, intermediate values of output block 312(i) of output 312 and softmax computations (not shown) may be written back to standard memory (e.g., HBM memory of GPUs), and recombined to determine final values during backward passes of the recursive computations. It should be noted that blocks of queries 302, keys 304, values 306, and the relative position embedding 310 that are not in the fast memory 308 during a current iteration (e.g., shown unshaded), may be stored in the HBM memory of the GPU(s) and/or other memory of a computing device. It should also be noted that previously loaded blocks of queries 302, keys 304, values 306, and the portion relative position embedding 310, are overwritten by next blocks of queries 302, keys 304, values 306, and the corresponding portion relative position embedding 310 at a next iteration.

In some examples, the first efficient relative position-aware attention method 300(1) may be implemented as a parallelizable kernel (e.g., a CUDA kernel), replacing a corresponding kernel of the I/O-aware attention algorithm implementation. For example, the I/O-aware attention kernel computes, in part, a dot product of query block 302(i) and transpose of key block 304(j), whereas, the corresponding kernel of the first efficient relative position-aware attention method 300(1) may add the relative position embedding block 310(i, j) to the key block 304(j) (or the query block 302(i)) before computing the dot product, as shown in Equation 1.

In some examples, the same relative position embedding 310 matrix may be used for efficient relative position-aware attention computation at all attention heads of multi-headed attention layers (of any of the encoder(s) and/or decoder(s)) of the transformer-based ML model. In such examples, though the computation of the relative position embedding matrix 310 is quadratic in the number of keys or queries, the relative position embedding matrix 310 may be computed once, and the same matrix reused in all layers of the transformer-based ML model. Therefore, with large transformer-based ML models, including a large number of attention layers, the computation of the relative position embeddings 310 approaches a fixed cost. The first efficient relative position-aware attention method 300(1) described herein enables training and deployment of larger transformer-based ML models (which may be more accurate), and faster training of such models, by reducing a time required to compute attention through efficient utilization of the fast memory 308.

FIG. 3B illustrates a second example method 300(2) of computation of efficient relative position-aware attention utilizing a limited-size fast memory. In the second example method 300(2), the relative position embeddings matrix 310 of the first example method 300(1) is not pre-computed and stored (e.g., in a HBM of a GPU), and instead, the block 310(i, j) of the relative position embeddings required for computation of attention at a current iteration (e.g., corresponding to (query, key) pairs in the query block 302(i) and key block 304(j)) are computed on the fly e.g., during the computation of attention scores at the current iteration.

In some examples of the second example method 300(2), computation of the relative position between tokens (e.g., a (query, key) pair) may be simplified by using a finite set of pre-defined query poses 314 and key poses 316. For example, the query poses 314 and the key poses 316 may represent a position and heading of a vehicle, which may be binned into a few poses (e.g., using 4 or 8 directions), and/or the pose may be limited based on knowledge of map features (e.g., heading of a vehicle may be along roadways in the map). The query poses 314 and the key poses 316 may be based on entities in the real world being represented by the queries and the keys e.g., if the keys 304 represent map features such as roadways, the key poses 316 may represent centers of lanes. The query poses 314 and the key poses 316 may be the same poses in some examples. In other examples, the query poses 314 may be different from the key poses 316. The relative position embeddings 310(i, j) may be computed (e.g., using a sine/cosine encoder or other type of position encoding) on the fly from the relative positions between the (query, key) pairs. In some examples, the computation of the relative position embeddings 310(i, j) may also be performed by the GPU using the fast memory 308. Other processing steps of the second example method 300(2) may be similar to the processing steps of the first example method 300(1).

In some examples, the second efficient relative position-aware attention method 300(2) may also be implemented as a parallelizable kernel (e.g., a CUDA kernel), replacing a corresponding kernel of the I/O-aware attention algorithm implementation. In such a kernel, the relative position embeddings 310(i, j) may be computed within the kernel, during computation of the attention score. In examples, the second example method 300(2) may be applied in scenarios where the poses of input tokens may vary significantly within a short time horizon.

Example System

Figure 4:
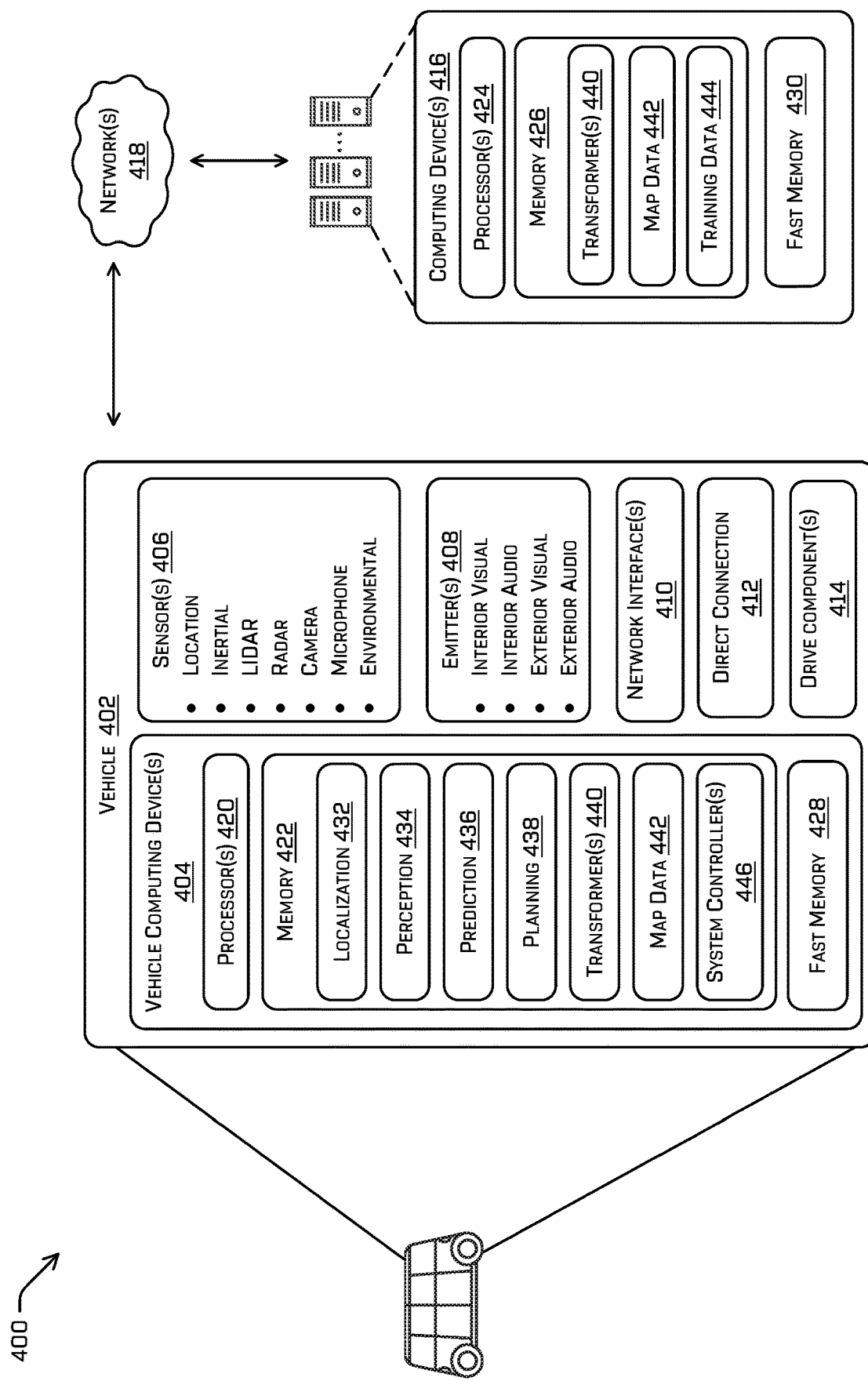
FIG. 4 illustrates a block diagram of an example system integrating and/or training a transformer-based machine-learned model that utilizes relative position embedding with I/O-aware computation of attention.

FIG. 4 illustrates a block diagram of an example system 400 that implements the techniques discussed herein. In some instances, the example system 400 may include a vehicle 402, which may represent the vehicle 402 in FIG. 1. In some instances, the vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 402 may be a fully or partially autonomous vehicle having any other level or classification. Moreover, in some instances, the techniques described herein may be usable by non-autonomous vehicles as well.

The vehicle 402 may include a vehicle computing device(s) 404, sensor(s) 406, emitter(s) 408, network interface(s) 410, at least one direct connection 412, and/or drive component(s) 414. Vehicle computing device(s) 404 may represent the computing device(s) 106 and sensor(s) 406 may represent the sensor system(s) 104. The system 400 may additionally or alternatively comprise computing device(s) 416.

In some instances, the sensor(s) 406 may include Lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 406 may include multiple instances of each of these or other types of sensors. For instance, the radar sensors may include individual radar sensors located at the corners, front, back, sides, and/or top of the vehicle 402. As another example, the cameras may include multiple cameras disposed at various locations about the exterior and/or interior of the vehicle 402. The sensor(s) 406 may provide input to the vehicle computing device(s) 404 and/or to computing device(s) 416. The position associated with a simulated sensor, as discussed herein, may correspond with a position and/or point of origination of a field of view of a sensor (e.g., a focal point) relative the vehicle 402 and/or a direction of motion of the vehicle 402.

The vehicle 402 may also include emitter(s) 408 for emitting light and/or sound, as described above. The emitter(s) 408 in this example may include interior audio and visual emitter(s) to communicate with passengers of the vehicle 402. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 408 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 402 may also include network interface(s) 410 that enable communication between the vehicle 402 and one or more other local or remote computing device(s). For instance, the network interface(s) 410 may facilitate communication with other local computing device(s) on the vehicle 402 and/or the drive component(s) 414. Also, the network interface(s) 410 may additionally or alternatively allow the vehicle to communicate with other nearby computing device(s) (e.g., other nearby vehicles, traffic signals, etc.). The network interface(s) 410 may additionally or alternatively enable the vehicle 402 to communicate with computing device(s) 416. In some examples, computing device(s) 416 may comprise one or more nodes of a distributed computing system (e.g., a cloud computing architecture).

The network interface(s) 410 may include physical and/or logical interfaces for connecting the vehicle computing device(s) 404 to another computing device or a network, such as network(s) 418. For example, the network interface(s) 410 may enable Wi-Fi-based communication such as via frequencies defined by the IEEE 802.11 standards, short range wireless frequencies such as ultra-high frequency (UHF) (e.g., Bluetooth®, satellite), cellular communication (e.g., 2G, 3G, 4G, 4G LTE, 5G, etc.), or any suitable wired or wireless communications protocol that enables the respective computing device to interface with the other computing device(s). In some instances, the vehicle computing device(s) 404 and/or the sensor(s) 406 may send sensor data, via the network(s) 418, to the computing device(s) 416 at a particular frequency, after a lapse of a predetermined period of time, in near real-time, etc.

In some instances, the drive component(s) 414 may include one or more sensors to detect conditions of the drive component(s) 414 and/or the surroundings of the vehicle 402. By way of example and not limitation, the sensor(s) of the drive component(s) 414 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 414. In some cases, the sensor(s) on the drive component(s) 414 may overlap or supplement corresponding systems of the vehicle 402 (e.g., the sensor(s) 406).

The drive component(s) 414 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 414 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 414. Furthermore, the drive component(s) 414 may also include one or more communication connection(s) that enable communication by the respective drive component with one or more other local or remote computing device(s).

In at least one example, the direct connection 412 can provide a physical interface to couple the one or more drive component(s) 414 with the body of the vehicle 402. For example, the direct connection 412 can allow the transfer of energy, fluids, air, data, etc. between the drive component(s) 414 and the vehicle. In some instances, the direct connection 412 can further releasably secure the drive component(s) 414 to the body of the vehicle 402.

The vehicle computing device(s) 404 may include processor(s) 420 and memory 422 communicatively coupled with the one or more processors 420. Memory 422 may represent memory 108. Computing device(s) 416 may also include processor(s) 424, and/or memory 426. The processor(s) 420 and/or 424 may be any suitable processor capable of executing instructions to process data and perform operations as described herein. By way of example and not limitation, the processor(s) 420 and/or 424 may comprise one or more central processing units (CPUs), and AI accelerator hardware such as graphics processing units (GPUs), tensor processing units (TPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 422 and/or 426 may be examples of non-transitory computer-readable media. The memory 422 and/or 426 may store an operating system and one or more software applications, instructions, programs, and/or data to implement the methods described herein and the functions attributed to the various systems. In various implementations, the memory may be implemented using any suitable memory technology, such as static random-access memory (SRAM), dynamic random-access memory (DRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some examples, the vehicle computing device(s) 404 and the computing device(s) 416 may be communicatively coupled with additional fast-speed memory, fast memory 428 and fast memory 430, respectively, which may provide significantly faster data access compared to the memory 422 and memory 426. In examples, the fast memory 428 and/or the fast memory 430 may be included in AI accelerators (e.g., GPUs, TPUs etc.). For example, the fast memory 428 and/or the fast memory 430 may comprise a static random-access memory (SRAM) of a GPU, which may provide high-speed data access (e.g., 19 Tb/s, compared to 8-15 Gb/s for DRAM-based memory), but may be limited to a small size (e.g., 20 Mb, compared to for 1-2 Tbs of DRAM-based memory).

In some instances, the memory 422 and/or memory 426 may store a localization component 432, perception component 434, prediction component 436, planning component 438, transformer(s) 440, map data 442, training data 444, and/or system controller(s) 446—zero or more portions of any of which may be hardware, such as GPU(s), CPU(s), and/or other processing units. Perception component 434 may represent perception component 116, prediction component 436 may represent prediction component 118, planning component 438 may represent planning component 112, transformer(s) 440 may represent transformers 120(1), 120(2), map data 442 may represent map data 110, and/or system controller(s) 446 may represent the controller(s) 114.

In at least one example, the localization component 432 may include hardware and/or software to receive data from the sensor(s) 406 to determine a position, velocity, and/or orientation of the vehicle 402 (e.g., one or more of an x-, y-, z-position, roll, pitch, or yaw). For example, the localization component 432 may include and/or request/receive map(s)

of an environment, such as map data 442, and can continuously determine a location, velocity, and/or orientation of the autonomous vehicle within the map(s). In some instances, the localization component 432 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, orientation, and/or velocity of the autonomous vehicle. In some examples, the localization component 432 may determine localization and/or mapping data comprising a pose graph (e.g., a sequence of position(s) and/or orientation(s) (i.e., pose(s)) of the vehicle 402 in space and/or time, factors identifying attributes of the relations therebetween, and/or trajectories of the vehicle for accomplishing those pose(s)), pose data, environment map including a detected static object and/or its distance from a pose of the vehicle 402, and/or the like In some instances, the localization component 432 may provide data to various components of the vehicle 402 to determine an initial position of an autonomous vehicle for generating a trajectory and/or for generating map data. In some examples, localization component 432 may provide, to the perception component 434, prediction component 436, and/or transformer(s) 440 a location and/or orientation of the vehicle 402 relative to the environment and/or sensor data associated therewith.

In some instances, perception component 434 may comprise a primary perception system and/or a prediction system implemented in hardware and/or software. The perception component 434 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, acceleration, and/or other state associated with an object), and/or the like. The perception component 434 may include a prediction component that predicts actions/states of dynamic components of the environment, such as moving objects, although the prediction component may be separate, as in the illustration. In some examples, the perception component 434 may determine a top-down representation of the environment that encodes the position(s), orientation(s), velocity (ies), acceleration(s), and/or other states of the objects and/or map data in the environment. For example, the top-down representation may be an image with additional data embedded therein, such as where various pixel channel values encode the perception data and/or map data discussed herein. Data determined by the perception component 434 is referred to as perception data.

The prediction component 436 may predict a future state of an object in the environment surrounding the vehicle 402. In some examples, the prediction component 436 may include the transformer(s) 440, although in additional or alternate examples the transformer(s) 440 may be separate component. The future (predicted) state may indicate a predicted object position, orientation, velocity, acceleration, and/or other state (e.g., door state, turning state, intent state such as signaling turn) of a detected object. Data determined by the prediction component 436 is referred to as prediction data. In some examples, the prediction component 436 may determine a top-down representation of a predicted future state of the environment. For example, the top-down representation may be an image with additional data embedded therein, such as where various channel pixel values encode the prediction data discussed herein.

The planning component 438 may receive a location and/or orientation of the vehicle 202 from the localization component 432 and/or perception data from the perception component 434 and may determine instructions for controlling operation of the vehicle 402 based at least in part on any of this data. In some examples, the memory 422 may further store map data, which is undepicted, and this map data may be retrieved by the planning component 438 as part of generating the environment state data discussed herein. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic, such as may be generated by system controller(s) of the drive component(s) 414)) that the drive component(s) 414 may parse/cause to be carried out, second instructions for the emitter(s) 408 may be formatted according to a second format associated therewith). In some examples, where the planning component 438 may comprise hardware/software-in-a-loop in a simulation (e.g., for testing and/or training the planning component 438), the planning component 438 may generate instructions which may be used to control a simulated vehicle. These instructions may additionally or alternatively be used to control motion of a real-world version of the vehicle 402, e.g., in instances where the vehicle 402 runs the simulation runs on vehicle during operation.

In some examples, the map data 442 may comprise a two-dimensional or three-dimensional representation of the environment, characteristic(s) associated therewith, and/or embedding(s). A two-dimensional representation may include, for example, a top-down representation of the environment and a three-dimensional representation may comprise position, orientation, and/or geometric data (e.g., a polygon representation, a digital wire mesh representation). Either representation may comprise a label associated with a portion of the top-down representation indicating different characteristic(s) and/or feature(s) of the environment, such as the existence and/or classification of a static object (e.g., signage, mailboxes, plants, poles, buildings, and/or the like); areas of the environment relevant to the vehicle's operations (e.g., crosswalks, drivable surfaces/roadways, turning lanes, controlled intersections, uncontrolled intersections, sidewalks, passenger pickup/drop-off zones, and/or the like); conditional lighting data depending on the time of day/year and/or the existence and location of light sources; object characteristics (e.g., material, refraction coefficient, opacity, friction coefficient, elasticity, malleability); occlusion data indicating portion(s) of the environment that are occluded to one or more sensors of the vehicle 402; and/or the like. The occlusion data may further indicate occlusions to different classes of sensors, such as portion(s) of the environment occluded to visible light cameras but not to radar or lidar, for example. The two-dimensional representation and/or three-dimensional representation may have embeddings associated therewith that encode this data via the learned process discussed herein. For example, for a three-dimensional representation of the environment comprising a mesh, an embedding may be associated with a vertex of the mesh that encodes data associated with a face that may be generated based on one or more vertices associated with the face. For a two-dimensional representation of the environment an edge or other portion of the top-down representation may be associated with an embedding.

The memory 422 and/or 426 may additionally or alternatively store a mapping system, a planning system, a ride management system, simulation/prediction component, etc.

As described herein, the localization component 432, the perception component 434, the prediction component 436, the planning component 438, transformer(s) 440, and/or other components of the architecture 200 may comprise one or more ML models. For example, localization component 432, the perception component 434, the prediction component 436, and/or the planning component 438 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

The transformer(s) 440 may comprise a transformer comprising encoder(s) and/or decoder(s) trained to generate the perception data discussed herein. For example, the encoder(s) and/or decoder(s) may have an architecture similar to visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, RoBERTa, XLNet, GPT, GPT-2, GPT-3, GPT-4, or the like. Additionally or alternatively, the transformer(s) 440 may comprise one or more neural network components, such as a convolutional neural network (CNN), multi-layer perceptron (MLP), VQGAN, which combines an autoregressive transformer with convolutional network components (or any other generative adversarial network (GAN), CLIP (which can be used to enhance sensor data learning with natural language supervision, or VQGAN and CLIP used together. The transformer(s) 440 may comprise the transformer-based machine-learned model architecture and processes discussed in more detail herein.

In some examples, the transformer(s) 440 may be trained at computing device(s) 416 based at least in part on map data 442 (which may be the same or different than the map data 442 stored in memory 422 on the vehicle 402) and/or training data 444. Training data 444 may include task-specific training data, such as motion tracks of objects in an environment that are determined from perception data or synthetic motion tracks from simulated environments, sensor data and associated ground truth perception data taken from log data or synthetically generated; sensor data and/or perception data and associated ground truth prediction data taken from log data or synthetically generated; sensor data and associated ground truth localization data taken from log data or synthetically generated; and/or sensor data, perception data, prediction data, and/or localization data and associated ground truth prediction data taken from log data or synthetically generated. For example, the training data may comprise input data, such as sensor data, map data, and/or an object track, and ground truth data associated with the task for which the transformer(s) 440 is being trained, such as the predicted state of an object. In some examples, training the transformer(s) 440 may be self-supervised or semi-self supervised using the ground truth data discussed above. For example, the ground truth data may include perception data determined by the perception component 434 of the vehicle for a first stage of training the transformer(s) 440. Further refined ground truth data determined by a larger, more complex ML model and/or human labelling may be used for a second stage of training the transformer(s) 440 that may further refine the training of the transformer(s) 440, although in one example, just this complex ML model and/or human labelling may be used instead of using two stages. In an additional or alternate example, a larger and more complex model than could be used on vehicle 402 can be used to generate the ground truth data and/or human labelling may additionally or alternatively be used to generate the ground truth data, such as by modifying ground truth data generated from log data or a powerful offline model to adjust the ground truth data for errors. In some examples, once the transformer(s) 440 has been trained at computing device(s) 416, it may be transmitted to vehicle 402 for storage in memory 422 and may cause processor(s) 420 to cause the operations discussed herein. In examples, the attention computation during the training, and/or attention computation during operations of the transformer(s) 440 on the vehicle 402 may utilize the fast memory 428, 430 to speed-up the computations as described herein.

In some examples, training the transformer(s) 440 may include encoder and decoder portions configured according to the discussion herein. Training the transformer-based machine-learned model may comprise receiving training data that includes input data, such as object data including positions and/or orientations of objects over time, and ground truth data associated with the outputs for which the transformer-based machine-learned model is being trained, such as a ground truth future object data indicating actual positions and/or orientations of the objects. The input data and/or ground truth data may include perception data that was determined based on the sensor data that was generated by the vehicle and previously stored as part of log data.

For example, the perception data may include a series of object detections and/or tracks. In other words, object detection, and/or track for the detected object may be determined at each computational tick, each of which may indicate current data relative to that computational tick. Since this data may be stored as log data, one tick of this data may be used as input data and subsequent data that comes later in time may be used as ground truth a prediction generated from the input data. For example, the vehicle may determine a first object detection for an object at the first time, and a first track for the object up to that first time and a second object detection for the object at the second time. Training the transformer(s) 440 may comprise using the data from the first time as input to determine a predicted position and/or orientation of the object at the second time and determining an error between the predicted position and/or orientation of the object and a position and orientation of the second object detection.

Training the transformer-based machine-learned model discussed herein may include determining a difference between an output of the transformer-based machine-learned model and the ground truth data. A loss (e.g., L1 loss, L2 loss, Huber loss, square root of the mean squared error, Cauchy loss, or another loss function), may be determined based on this difference and that loss may be backpropagated through the component(s) of the transformer-based machine learning model architecture discussed herein. This means that parameter(s) of any of these components may be altered (using gradient descent) to reduce this loss such that, if the transformer-based machine-learned model repeated the process on the same input data, the resultant loss would be less than it was on the last run. This process may be repeated for multiple iterations of data, known as a training dataset. For example, the training may comprise altering one or more weights of the weight(s) that generate the queries, keys, and values discussed herein, parameter(s) of the multi-headed attention layers (of any of the encoder(s) and/or decoder(s)), weight(s) and/or biases associated with the feedforward network(s) discussed herein (of any of the encoder(s) and/or decoder(s)), and/or the embedding(s) themselves associated with the objects.

In some examples, training the transformer-based machine learning model architecture portion for determining an embedding for an object (e.g., a patch or portion of sensor data representing the object) may include instantiating the embedding(s) as tensors with random values. An encoder may receive a portion of object data and may determine an embedding associated therewith, modifying the original random embedding associated with the portion of object data if this is the first time this embedding has been updated by the encoder as part of training.

The training may be conducted such that decoder may determine a reconstruction of object data, based at least in part on the embedding generated by the encoder. In other words, the decoder is trained to determine a reconstruction that matches the originally input object data. Ideally, the reconstruction and the object data would be identical. Training the example architecture may comprise determining a loss (e.g., L1 loss, L2 loss, Huber loss, square root of the mean squared error, Cauchy loss, or another loss function) based on a difference between the reconstruction output by the encoder and the top-down representation or object data used by the encoder to generate the embedding. Gradient descent may then be used by altering parameter(s) of the encoder and/or decoder to reduce the loss.

In some examples, training the example architecture may further comprise masking and/or removing a portion of the object data provided as input to the encoder. In some examples, the masking may be gradually introduced, i.e., the masking/removal may start at some point after the beginning of the training and, in some examples, may progressively increase. In some examples, masking may start from the beginning of training. Masking may comprise voiding, covering, or otherwise replacing portions of the object data with nonce values or noise. Again, this removal may gradually increase as training epochs pass and/or as the training accuracy hits certain milestones, such as meeting or exceeding accuracy metric(s), such as by reducing the average loss below an average loss threshold.

In some examples, the process described above may be used as a pre-training step, after which the decoder may be removed and the embedding(s) and/or the encoder may be trained using a loss determined for the transformer-based machine-learned model discussed above, comprising architecture(s) 200. In such an example, embeddings may be updated directly to reduce the loss and/or one or more parameters of any one or more of the encoders and/or the decoders may be modified to reduce the loss determined based at least in part on an output of architecture 200.

In some examples, the transformer-based machine learning model discussed herein, which may include architecture 200, may be reduced in size, which may reduce the computational resources required to store and/or run the architectures. For example, knowledge distillation may be used to reduce the architecture 200 to a smaller transformer-based machine learning model. Knowledge distillation may include, for example, transformer pruning, quantization, and/or student-teacher training, which may include response-based distillation, feature-based distillation, and/or relation-based distillation, and may be conducted offline, online, or via self-distillation.

Although discussed in the context of transformers, any type of machine-learning can be used consistent with this disclosure. For example, machine-learning algorithms can include, but are not limited to, neural networks, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, Hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, Xception, ConvNext, and the like; visual transformer(s) (ViT(s)), such as a bidirectional encoder from image transformers (BEIT), visual bidirectional encoder from transformers (Visual-BERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. Pat. No. 10,649,459, filed Apr. 26, 2018, which is incorporated by reference in its entirety herein for all purposes), and/or VoxelNet. Architecture latency optimizations may include Mobilenet V2, Shufflenet, Channelnet, Peleenet, and/or the like. The ML model may comprise a residual block such as Pixor, in some examples.

Memory 422 may additionally or alternatively store one or more system controller(s) 446 (which may be a portion of the drive component(s)), which may be configured to control steering, propulsion, braking, safety, emitters, communication, and other systems of the vehicle 402. These system controller(s) may communicate with and/or control corresponding systems of the drive component(s) 414 and/or other components of the vehicle 402. For example, the planning component 438 may generate instructions based at least in part on perception data generated by the perception component 434 and/or simulated perception data and transmit the instructions to the system controller(s), which may control operation of the vehicle 402 based at least in part on the instructions.

Memory 426 and/or memory 422 may additionally or alternatively store a simulation component. The simulation component may determine the prediction discussed herein using the transformer(s) 440 and techniques discussed herein. In some examples, the simulation component may determine a simulation of the environment and/or the vehicle 402, such as simulating execution of a candidate action by the vehicle 402 and a predicted state of the environment based at least in part on the passage of time, progress of the vehicle, and response to execution of the candidate action by the vehicle 402 by any dynamic object(s) in the environment. For example, the simulation may comprise a representation of a position, orientation, movement, and/or quality of portions of the environment and/or the vehicle 402. The environment may comprise an agent, such as another vehicle, a pedestrian, vegetation, a building, signage, and/or the like. In some examples, the simulation component may receive a candidate action, map data 442, and/or environment state (which may be a current simulated environment state determined by the perception component 434 based at least in part on simulation data and/or a predicted environment state determined by the transformer 440). The simulation component may use this data as part of determining, by the transformer(s) 440, a predicted state of object(s) and/or the environment responsive to the candidate action, i.e., should the candidate action be carried out by the vehicle 402.

It should be noted that while FIG. 4 is illustrated as a distributed system, in alternative examples, components of the vehicle 402 may be associated with the computing device(s) 416 and/or components of the computing device(s) 416 may be associated with the vehicle 402. That is, the vehicle 402 may perform one or more of the functions associated with the computing device(s) 416, and vice versa.

Figure 5:
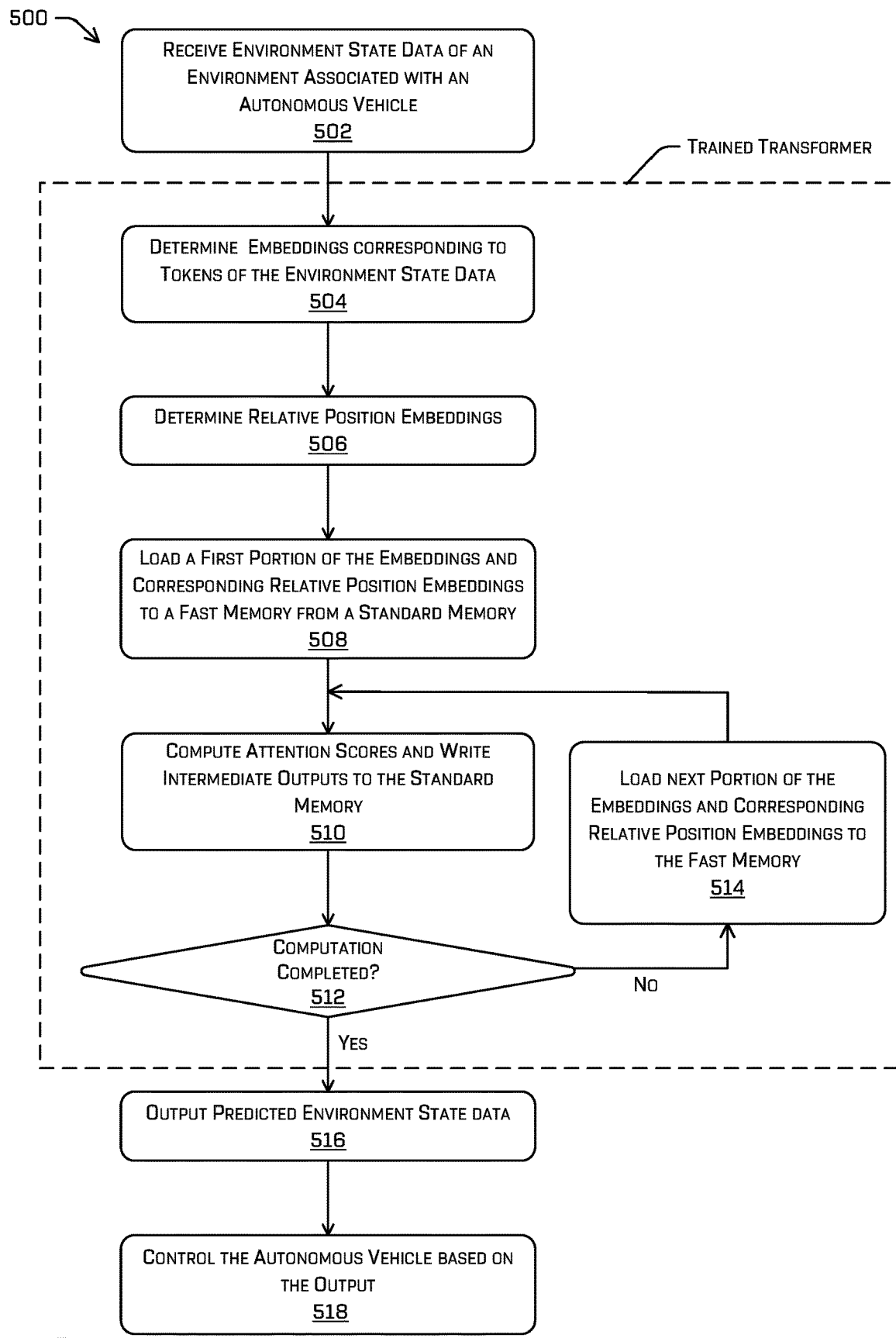
FIG. 5 illustrates a flow diagram of an example process for utilizing a trained transformer-based machine-learned model to predict an environment state data, according to the disclosure herein.
Figure 6:
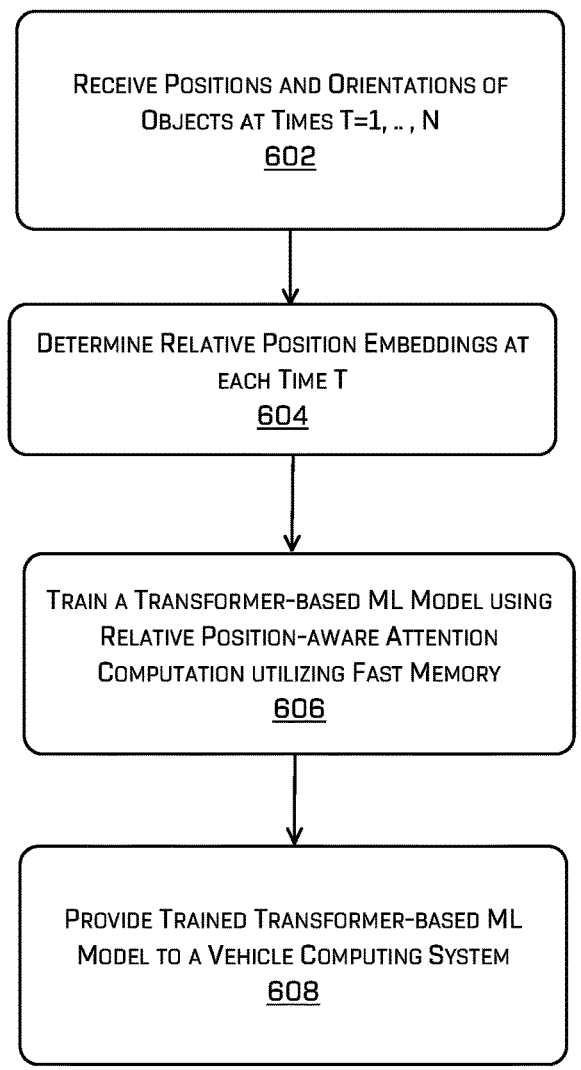
FIG. 6 illustrates a flow diagram of an example process for obtaining a trained transformer-based machine-learned model for deploying on a vehicle, according to the disclosure herein.

Example Processes to Determine Prediction Data Using the Transformer-Based Machine-Learned Model FIGS. 5 and 6 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 5 depicts an example process 500 for determining, by a transformer-based ML model discussed herein, a predicted environment state, and controlling an autonomous vehicle based on the prediction. As indicated in FIG. 5, one or more operations of the process 500 may be included as a part of the transformer-based ML model (e.g., a trained transformer). In some examples, example process 500 may be executed by the vehicle 102, or the vehicle 402. For example, vehicle 102 may be configured, in hardware and/or software, with the architecture 200 and may execute example process 500. In some examples, parameters associated with the transformer-based ML model may be determined during a training phase of the transformer-based ML model performed on a remote computing system, separate from the computing device(s) of the vehicle, and the trained transformer-based ML model may be deployed to an onboard computing device(s) of the autonomous vehicle to perform the operations of the process 500.

In some examples, component(s) of the vehicle 102, such as the prediction component 118 or the perception component 116 may execute process 500, such as by one or more CPU(s), GPU(s), TPU(s), and/or other processing units (e.g., ASIC(s), FPGA(s)), to predict a position and/or classification of an object in sensor data (e.g., object detection) or predict motion or behavior of an object in future times. The operations of example process 500 may be used in combination, separately, and/or performed by the same device or different devices. For example, the operations can be implemented by a computing device of an autonomous vehicle 102 or the vehicle 402 and/or a remote computing device, such as the computing device(s) 416 (e.g., of a distributed computing service, of a teleoperations system). In the latter example, the autonomous vehicle 202 may transmit and receive data from a remote computing device while the processing of the operations is conducted at the remote computing device.

At operation 502, example process 500 may comprise receiving environment state data of an environment associated with an autonomous vehicle. The environment state data may include one or more of object data, sensor data or map data, according to any of the techniques discussed herein. The sensor data may be any of the sensor data discussed herein, such as image data (e.g., visible light, infrared), Lidar data (e.g., aggregated into a point cloud), radar data, sonar data, microwave data, and/or the like. In examples, the object data may include previous behavior of the object, type of object (e.g., object classification), current and previous motion of the object, current and previous position and orientation of the object, associated map features, and the like. In some examples, the object data may be generated by a component of the vehicle, such as the perception component 116, and may be included in the perception data. In some examples, the map data may comprise geometric data identifying shape(s) of surfaces in the environment and/or position and types of map features (e.g., lanes, sidewalks, traffic lights, stop signs, etc.). In some examples, the map data may be determined by SLAM based at least in part on sensor data and/or previously generated and stored map data.

At operation 504, the process 500 may comprise determining embeddings corresponding to tokens of the environment state data. In various examples, the tokens may correspond to patches in images, portions of sensor data, objects in the environment, cells or patches in a top-down representation, map features, and the like. Examples of encoders for generating token embeddings corresponding to objects, sensor data, and map data are described in U.S.

application Ser. No. 18/304,975, filed Apr. 21, 2023, the entirety of which is incorporated by reference herein, as noted above.

At operation 506, the process 500 may comprise determining relative position embeddings between the tokens or embeddings determined at the operation 504. In some examples, relative position embeddings may represent relative spatial relationships between the tokens in the environment. For example, relative positions between tokens may be expressed in a two- or three-dimensional space (e.g., in a 2D top-down representation of the environment or a 3D mesh representation of the environment). In other examples, the position embeddings may represent relationships in an embedding space. In examples, relative position embeddings corresponding to relative positions between tokens or embeddings may be obtained using various relative position encoding (RPE) methods, which may include fixed encodings, such as a sine/cosine encoding, or learned encodings using a trained encoder.

At operation 508, the process 500 may comprise loading a first portion of the embeddings and corresponding relative position embeddings to a fast memory from a standard memory, during a first iteration. In examples, a computing system implementing the process 500 may include graphics processing units (GPUs) or other AI accelerator hardware that includes fast, on-chip memory, such as a static random-access memory (SRAM) of a GPU, which may be of limited size (e.g., the embeddings and relative position embeddings generated at the operations 504, 506 may not fit in the fast memory. The first portion of the embeddings may include a portion (e.g., a block or tile) of the embeddings (e.g., corresponding to queries, keys, and values in a transformer-based ML architecture) that fits in the fast memory, and the corresponding relative position embeddings may represent relative positions between pairs of queries and keys embeddings included in the first portion.

At operation 510, the process 500 may comprise computing attention scores and writing intermediate outputs to the standard memory. As an example, a relative position-aware attention score may be computed by adding respective relative position embeddings to the keys embeddings and determining a dot product between the queries embeddings and a transpose of the keys embeddings after addition of the relative position embeddings. It is to be noted that the attention scores are computed for the first portion of the embeddings loaded in the fast memory at the operation 508, and therefore, are partial results. Intermediate outputs and computations may be stored back to the standard memory, following processing steps of an iterative standard I/O-aware attention computation algorithm.

At operation 512, the process 500 may comprise determining if the computation of attention scores is completed. For example, the computation is completed when attention scores have been computed for all blocks or tiles of the queries and keys embeddings. If the computation is not completed (at 512—No), at an operation 514, the process 500 may load a next portion of the embeddings (e.g., corresponding to next blocks of queries, keys, and values in a transformer-based ML architecture) to the fast memory. Since the fast memory may have limited storage capacity, the previously loaded blocks of embeddings may be overwritten at the operation 514 with the next portions of the embeddings.

In some examples, he process 500 may comprise iterating over operations 512 and 514, at each iteration computing attention scores (and intermediate results) for a portion of the embeddings loaded into the fast memory. When the computation is completed (at 512—Yes), at an operation 516, the process 500 may comprise outputting predicted environment state data. The operation 516 may include recursively combining the intermediate results written to the standard memory during the operation 508. In some examples, the intermediate results may be loaded into the fast memory to perform computations to determine the final outputs, following processing steps of the standard I/O-aware attention computation algorithm. In one example, the predicted environment state data may include indications of detected objects in portions of sensor data. In another example, the predicted environment state data may include positions and orientations or objects in the environment or a motion track or trajectory of the object in the environment during future time instances.

At operation 518, the process 500 may comprise controlling the autonomous vehicle based on the output. For example, the planning component 112 may determine a route for the autonomous vehicle (such as the vehicle 102) from a first location to a second location based at least in part on any of the outputs. For example, the planning component 112 may generate a plurality of candidate trajectories for controlling motion of the vehicle 102 (e.g., in accordance with a receding horizon or a distance horizon technique) to control the vehicle to traverse the environment. In some examples, the planning component 112 may select a candidate trajectory of the autonomous vehicle based on avoiding collisions with any of the detected objects and/or following traffic patterns indicated by the predicted motion tracks of other objects in the environment. The selected candidate trajectory may be used to generate a drive control signal that may be transmitted to drive components of the autonomous vehicle. Determining which of the candidates to implement may be based at least in part on a cost function that is based at least in part on the predicted environment state data e.g., detected objects or predicted motion tracks of objects, and a confidence level associated with the prediction. In another example, the planning component 112 may determine other controls based at least in part on the predicted state(s), such as whether to open or close a door of the vehicle, activate an emitter of the vehicle, or the like.

FIG. 6 illustrates an example process 600 for obtaining a trained transformer-based machine-learned model for deploying on a vehicle. In some examples, example process 600 may be executed by computing device(s), such as the computing device(s) 416, equipped with specialized hardware and/or software, and/or multiple processors, to provide large computing resources required for training a transformer-based ML model. The trained transformer-based ML model may be deployed on a vehicle's on-board computing device(s) for performing prediction tasks, as described herein. Though the process 600 is described with an example related to predicting motion of objects, it is understood that the process 600 may be used for training transformer-based ML models configured to generate other types of predictions (e.g., object detection in sensor data, semantic segmentation, object behavior forecasting, etc.), by using an appropriate training set including inputs and target outputs corresponding to the respective type of prediction.

At operation 602, the process 600 may include receiving positions and orientations of objects at a sequence of time instances as training data. The training data may include object positions and orientations that were ascertained to be ground truth (e.g., true positions and orientations). In some examples, the object positions and orientations may be determined by vehicle systems and saved as part of log data. In other examples, the training data may be generated by a simulator modeling object motion in a simulated environment. In some examples, the training data may be manually verified or refined.

At operation 604, the process 600 may include determining relative position embeddings, at each time instance, between pairs of embeddings representing object data (e.g., position and orientation of object). The relative position embeddings may represent a relative spatial relationship (e.g., a vector indicating a difference between positions/orientations of a pair of objects represented in the embeddings), for each pair of embeddings. The relative position embeddings may be determined by applying a relative position encoding technique to relative positions and orientations of pair of tokens. Such techniques may include fixed position encodings (such as sine/cosine encoding) or learned encodings.

At operation 606, the process 600 may include training a transformer-based ML model using a relative position-aware attention computation utilizing a fast memory (e.g., a SRAM of a GPU). In examples, training of the transformer-based ML models may include determining a difference between an output of the transformer-based ML model and the ground truth data of the training data. Parameter(s) of any of the components of the transformer-based ML model may be altered (using gradient descent) to reduce this difference (or loss). This process may be repeated for multiple iterations of data instances from the training data. For example, the training may comprise altering one or more weights of the weight(s) that generate the queries, keys, and values discussed herein, parameter(s) of the multi-headed attention layers (of any of the encoder(s) and/or decoder(s)), weight(s) and/or biases associated with the feedforward network(s) discussed herein (of any of the encoder(s) and/or decoder(s)), and/or the embedding(s) themselves. During the training, an attention score needs to be computed at various points to determine the outputs of the transformer-based ML model. As described with reference to FIGS. 2 and 3, the attention scores computed may include the relative position embeddings computed at the operation 604, and the method 300(1) or 300(2) may be used to compute the attention scores efficiently by utilizing the fast memory.

At operation 608, the process 600 may include providing the trained transformer-based ML model to a vehicle computing system. The vehicle computing system may use the trained transformer-based ML model illustrated in the example of FIG. 6 in a prediction component to predict future positions and orientations of object(s) in the environment based on their current positions/orientations and their past positions and orientations. The vehicle computing system may use the predicted output of the trained transformer-based ML model to control the vehicle to avoid potential collisions with other objects, and to determine a trajectory of the vehicle that is based on awareness of predicted motion of the other objects. For example, the vehicle may follow the motion pattern of the other objects (e.g., slow down if other objects (such as vehicles) are slowing down).

Example Clauses

A: A system comprising: one or more processors; a first memory; a second memory, wherein: the first memory has a first memory speed faster than a second memory speed of the second memory; and one or more computer-readable media storing processor-executable instructions that, when executed by the one or more processors, cause the system to perform operations comprising: receiving environment state data indicating at least one of object data, map data, or sensor data characterizing an environment associated with a vehicle; determining a first embedding and a second embedding based at least in part on the environment state data; determining a relative position embedding that is based at least in part on a relative position of the first embedding to the second embedding; determining, by a transformer-based machine-learned model, an attention output, wherein determining the attention output comprises iteratively: loading, from the second memory and into the first memory, the first embedding, the second embedding, and the relative position embedding; determining, based on combining the relative position embedding with at least one of the first embedding or the second embedding, an intermediate tensor; determining, by performing multiple operations on the intermediate tensor, the attention output; and storing the attention output in the second memory; determining, based on the attention output, a prediction related to the environment state data; and controlling the vehicle based at least in part on the prediction.

B: The system of paragraph A, wherein: a first portion of the first embedding, the second embedding, and the relative position embedding are loaded at a first iteration, and a second portion, different from the first portion, of the first embedding, the second embedding, and the relative position embedding are loaded at a second iteration.

C: The system of paragraph A or B, wherein the relative position embedding is determined, based at least in part on a first portion of the first embedding and a second portion of the second embedding, while the first portion and the second portion are loaded in the first memory.

D: The system of paragraph C, wherein determining the relative position embedding comprises: accessing a first pose corresponding to the first embedding and a second pose corresponding to the second embedding, wherein the relative position embedding is based at least in part on the first pose and the second pose.

E: The system of any one of paragraphs A-D, wherein the first embedding is a key and the second embedding is a query or value for an attention mechanism of the transformer-based machine-learned model.

F: The system of any one of paragraphs A-E, wherein the environment state data indicates object data comprising a position and an orientation of an object in the environment at a first time, and the operations further comprise: determining, by the transformer-based machine-learned model, a predicted position and a predicted orientation of the object at a second time after the first time, wherein controlling the vehicle is based at least in part on the predicted position and the predicted orientation.

G: The system of any one of paragraphs A-F, wherein the environment state data, and the operations further comprise: determining, by the transformer-based machine-learned model, a portion of the sensor data corresponding to an object in the environment.

H: The system of any one of paragraphs A-G, wherein combining the relative position embedding comprises one of: adding the relative position embedding to the first embedding or the second embedding, concatenating the relative position embedding to the first embedding or the second embedding, or multiplying the relative position embedding with the first embedding or the second embedding.

I: One or more non-transitory computer-readable media storing processor-executable instructions that, when executed by one or more processors, perform operations comprising: receiving environment state data characterizing an environment associated with a vehicle; determining a first embedding and a second embedding based at least in part on the environment state data; determining a relative position embedding that is based at least in part on a relative position of the first embedding to the second embedding; determining, by a transformer-based machine-learned model, a prediction related to the environment state data, wherein: the transformer-based machine-learned model computes an attention output based on the first embedding, the second embedding, and the relative position embedding by iteratively loading, into a first memory, at least a portion of the first embedding, a portion of the second embedding, and a portion of the relative position embedding, wherein the first memory has at least one property that is faster than a corresponding property of the one or more non-transitory computer-readable media; and controlling the vehicle based at least in part on the prediction.

J: The one or more non-transitory computer-readable media of paragraph I, wherein: the environment state data comprises object data indicating a position and orientation of an object in the environment, and the prediction comprises a future position or a future orientation of the object.

K: The one or more non-transitory computer-readable media of paragraph I or J, wherein: the environment state data comprises sensor data indicative of an object in the environment, and the prediction comprises a location of the object in the sensor data.

L: The one or more non-transitory computer-readable media of any one of paragraphs I-K, wherein the at least one property comprises one of access speed, throughput, or latency.

M: The one or more non-transitory computer-readable media of any one of paragraphs I-L, wherein determining the relative position embedding comprises: loading, into the first memory, a first pose associated with the first embedding and a second pose associated with the second embedding; and determining, by a machine-learned model based at least in part on the first pose and the second pose, the relative position embedding.

N: The one or more non-transitory computer-readable media of any one of paragraphs I-M, wherein computing the attention output comprises: determining, by performing multiple operations on the portion of the relative position embedding, the portion of the first embedding, and the portion of the second embedding, a first portion of the attention output; unloading, from the first memory, the portion of the relative position embedding, the portion of the first embedding, and the portion of the second embedding; and storing, in a second memory, different from the first memory, the first portion of the attention output.

O: The one or more non-transitory computer-readable media of any one of paragraphs I-N, wherein the attention output is based on self-attention or cross-attention.

P: The one or more non-transitory computer-readable media of any one of paragraphs I-O, wherein the prediction comprises at least one of a future position, orientation, classification, velocity, or acceleration of an object in the environment.

Q: A method comprising: receiving environment state data characterizing an environment associated with a vehicle; determining a first embedding and a second embedding based at least in part on the environment state data, the first embedding and the second embedding being stored in a first memory; determining a relative position embedding that is based at least in part on a relative position of the first embedding to the second embedding; determining, by a transformer-based machine-learned model, an attention output, wherein determining the attention output comprises iteratively: loading, into a second memory, at least a portion of the first embedding, a portion of the second embedding, and a portion of the relative position embedding, wherein the second memory is faster than the first memory; determining, by performing multiple operations on the portion of the first embedding, the portion of the second embedding, and the portion of the relative position embedding, a portion of the attention output, wherein the multiple operations include at least adding the relative position embedding with one of the first embedding or the second embedding; and storing the portion of the attention output in the first memory; determining, by the transformer-based machine-learned model and based on the attention output, a prediction related to a future value of the environment state data; and controlling the vehicle based at least in part on the prediction.

R: The method of paragraph Q, wherein: the first embedding is a key and the second embedding is a query or value for an attention mechanism of the transformer-based machine-learned model, and the attention mechanism comprises self-attention or cross-attention.

S: The method of paragraph Q or R, wherein determining the relative position embedding comprises: receiving a first pose associated with the first embedding and a second pose associated with the second embedding; loading the first pose and the second pose into the second memory; and determining, by a position encoding mechanism and based at least in part on the first pose and the second pose, the relative position embedding.

T: The method of any one of paragraphs Q-S, wherein the relative position embedding is used for all heads of one or more multi-headed attention layers of the transformer-based machine-learned model.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors;
   a first memory;
   a second memory, wherein:
   the first memory has a first memory speed faster than a second memory speed of the second memory; and
   one or more computer-readable media storing processor-executable instructions that, when executed by the one or more processors, cause the system to perform operations comprising:
   receiving environment state data indicating at least one of object data, map data, or sensor data characterizing an environment associated with a vehicle;
   determining a first embedding and a second embedding based at least in part on the environment state data;
   determining a relative position embedding that is based at least in part on a relative position of the first embedding to the second embedding;
   determining, by a transformer-based machine-learned model, an attention output, wherein determining the attention output comprises iteratively:
   loading, from the second memory and into the first memory, the first embedding, the second embedding, and the relative position embedding;
   determining, based on combining the relative position embedding with at least one of the first embedding or the second embedding, an intermediate tensor;
   determining, by performing multiple operations on the intermediate tensor, the attention output; and
   storing the attention output in the second memory;
   determining, based on the attention output, a prediction related to the environment state data; and
   controlling the vehicle based at least in part on the prediction.

2. The system of claim 1, wherein:
   a first portion of the first embedding, the second embedding, and the relative position embedding are loaded at a first iteration, and
   a second portion, different from the first portion, of the first embedding, the second embedding, and the relative position embedding are loaded at a second iteration.

3. The system of claim 1, wherein the relative position embedding is determined, based at least in part on a first portion of the first embedding and a second portion of the second embedding, while the first portion and the second portion are loaded in the first memory.

4. The system of claim 3, wherein determining the relative position embedding comprises:
   accessing a first pose corresponding to the first embedding and a second pose corresponding to the second embedding,
   wherein the relative position embedding is based at least in part on the first pose and the second pose.

5. The system of claim 1, wherein the first embedding is a key and the second embedding is a query or value for an attention mechanism of the transformer-based machine-learned model.

6. The system of claim 1, wherein the environment state data indicates object data comprising a position and an orientation of an object in the environment at a first time, and the operations further comprise:
   determining, by the transformer-based machine-learned model, a predicted position and a predicted orientation of the object at a second time after the first time,
   wherein controlling the vehicle is based at least in part on the predicted position and the predicted orientation.

7. The system of claim 1, wherein the environment state data indicates sensor data, and the operations further comprise:
   determining, by the transformer-based machine-learned model, a portion of the sensor data corresponding to an object in the environment.

8. The system of claim 1, wherein combining the relative position embedding comprises one of:
   adding the relative position embedding to the first embedding or the second embedding,
   concatenating the relative position embedding to the first embedding or the second embedding, or
   multiplying the relative position embedding with the first embedding or the second embedding.

9. One or more non-transitory computer-readable media storing processor-executable instructions that, when executed by one or more processors, perform operations comprising:
receiving environment state data characterizing an environment associated with a vehicle;
determining a first embedding and a second embedding based at least in part on the environment state data;
determining a relative position embedding that is based at least in part on a relative position of the first embedding to the second embedding;
determining, by a transformer-based machine-learned model, a prediction related to the environment state data, wherein:
the transformer-based machine-learned model computes an attention output based on the first embedding, the second embedding, and the relative position embedding by iteratively loading, into a first memory, at least a portion of the first embedding, a portion of the second embedding, and a portion of the relative position embedding,
wherein the first memory has at least one property that is faster than a corresponding property of the one or more non-transitory computer-readable media; and
controlling the vehicle based at least in part on the prediction.

10. The one or more non-transitory computer-readable media of claim 9, wherein:
the environment state data comprises object data indicating a position and orientation of an object in the environment, and
the prediction comprises a future position or a future orientation of the object.

11. The one or more non-transitory computer-readable media of claim 9, wherein:
the environment state data comprises sensor data indicative of an object in the environment, and
the prediction comprises a location of the object in the sensor data.

12. The one or more non-transitory computer-readable media of claim 9, wherein the at least one property comprises one of access speed, throughput, or latency.

13. The one or more non-transitory computer-readable media of claim 9, wherein
determining the relative position embedding comprises:
loading, into the first memory, a first pose associated with the first embedding and a second pose associated with the second embedding; and
determining, by a machine-learned model based at least in part on the first pose and the second pose, the relative position embedding.

14. The one or more non-transitory computer-readable media of claim 9, wherein computing the attention output comprises:
determining, by performing multiple operations on the portion of the relative position embedding, the portion of the first embedding, and the portion of the second embedding, a first portion of the attention output;
unloading, from the first memory, the portion of the relative position embedding, the portion of the first embedding, and the portion of the second embedding; and
storing, in a second memory, different from the first memory, the first portion of the attention output.

15. The one or more non-transitory computer-readable media of claim 9, wherein
the attention output is based on self-attention or cross-attention.

16. The one or more non-transitory computer-readable media of claim 9, wherein the prediction comprises at least one of a future position, orientation, classification, velocity, or acceleration of an object in the environment.

17. A method comprising:
receiving environment state data characterizing an environment associated with a vehicle;
determining a first embedding and a second embedding based at least in part on the environment state data, the first embedding and the second embedding being stored in a first memory;
determining a relative position embedding that is based at least in part on a relative position of the first embedding to the second embedding;
determining, by a transformer-based machine-learned model, an attention output, wherein determining the attention output comprises iteratively:
loading, into a second memory, at least a portion of the first embedding, a portion of the second embedding, and a portion of the relative position embedding, wherein the second memory is faster than the first memory;
determining, by performing multiple operations on the portion of the first embedding, the portion of the second embedding, and the portion of the relative position embedding, a portion of the attention output,
wherein the multiple operations include at least adding the relative position embedding with one of the first embedding or the second embedding; and
storing the portion of the attention output in the first memory;
determining, by the transformer-based machine-learned model and based on the attention output, a prediction related to a future value of the environment state data; and
controlling the vehicle based at least in part on the prediction.

18. The method of claim 17, wherein:
the first embedding is a key and the second embedding is a query or value for an attention mechanism of the transformer-based machine-learned model, and
the attention mechanism comprises self-attention or cross-attention.

19. The method of claim 17, wherein determining the relative position embedding comprises:
receiving a first pose associated with the first embedding and a second pose associated with the second embedding;
loading the first pose and the second pose into the second memory; and
determining, by a position encoding mechanism and based at least in part on the first pose and the second pose, the relative position embedding.

20. The method of claim 17, wherein the relative position embedding is used for all heads of one or more multi-headed attention layers of the transformer-based machine-learned model.

* * * * *